United States Patent [19]

Sakai et al.

[11] Patent Number: 5,515,272
[45] Date of Patent: May 7, 1996

[54] APPARATUS FOR DIAGNOSING AUTOMATIC TRANSMISSION BASED ON ENGINE SPEED AS COMPARED WITH REFERENCE RANGE

[75] Inventors: Takahiro Sakai; Atsuo Okumura, both of Toyota; Koichi Miyamoto, Nagoya, all of Japan

[73] Assignee: Toyota Jidosha Kabushiki Kaisha, Toyota, Japan

[21] Appl. No.: 359,617

[22] Filed: Dec. 20, 1994

[30] Foreign Application Priority Data

Dec. 22, 1993 [JP] Japan .................................... 5325479

[51] Int. Cl.⁶ .............................. G06G 7/70; F16H 59/48
[52] U.S. Cl. ................. 364/424.1; 364/424.01;
364/426.01; 477/120; 477/131; 477/81;
477/107; 477/125; 477/126; 477/906; 74/335;
74/336 R; 74/483 PB; 475/129; 475/119;
475/132; 475/128; 73/118.1; 73/117.3; 180/273
[58] Field of Search ........................... 364/424.1, 426.01,
364/431.01, 571.05, 131; 477/120, 118,
905, 116, 125, 906, 131, 901, 904, 138,
53, 156, 114, 117, 163, 63, 65; 74/335,
336 R, 483 PB; 73/118.1, 117.3; 475/129,
119, 128, 132; 180/272, 285, 273; 371/68.1–68.3;
192/3.54, 3.28, 4 B; 361/242, 187

[56] References Cited

U.S. PATENT DOCUMENTS

| | | | |
|---|---|---|---|
| 3,747,438 | 7/1973 | Toyoda et al. | 477/120 |
| 4,367,528 | 1/1983 | Kawamoto et al. | 364/424.1 |
| 4,473,882 | 9/1984 | Suzuki et al. | 364/424.1 |
| 4,495,576 | 1/1985 | Ito | 364/424.1 |
| 5,216,938 | 6/1993 | Yamaguchi | 364/424.1 |
| 5,272,631 | 12/1993 | Iwatsuki et al. | 364/424.1 |
| 5,393,275 | 2/1995 | Okada et al. | 364/424.1 |
| 5,393,278 | 2/1995 | Kyushima et al. | 477/120 |

FOREIGN PATENT DOCUMENTS

| | | |
|---|---|---|
| 61-236955 | 10/1986 | Japan . |
| 62-177342 | 8/1987 | Japan . |
| 1176856 | 7/1989 | Japan . |
| 1172663 | 7/1989 | Japan . |
| 280851 | 3/1990 | Japan . |

*Primary Examiner*—Kevin J. Teska
*Assistant Examiner*—Jacques H. Louis-Jacques
*Attorney, Agent, or Firm*—Oblon, Spivak, McClelland, Maier, & Neustadt

[57] ABSTRACT

A diagnosing apparatus for diagnosing a vehicle automatic transmission system including an automatic transmission having frictional coupling devices, and solenoid-operated valves for controlling the frictional coupling devices to shift the automatic transmission according to shift commands generated by a control device, the apparatus including a speed detector for detecting an engine speed of the vehicle, a device for determining a reference range of the engine speed within which the engine speed is expected to fall when the transmission is placed in a position selected by a shift command, a device for determining whether a predetermined running condition of the vehicle is satisfied, and a defect detector for determining whether there exists a defect associated with the automatic transmission system, depending upon whether the detected engine speed is held within or outside the determined reference range when the predetermined vehicle running condition is satisfied.

17 Claims, 23 Drawing Sheets

FIG. 2

| SHIFT LEVER POSITION | TRANS-MISSION POSITION | SOLENOID-OPERATED VALVES | | | CLUTCHES | | | BRAKES | | | |
|---|---|---|---|---|---|---|---|---|---|---|---|
| | | S1 | S2 | SL | C0 | C1 | C2 | B0 | B1 | B2 | B3 |
| D | 1ST | ○ | × | × | ○ | ○ | × | × | × | × | × |
| | 2ND | ○ | ○ | △ | ○ | ○ | × | × | × | ○ | × |
| | 3RD | × | ○ | △ | ○ | ○ | ○ | × | × | ○ | × |
| | O/D | × | × | △ | × | ○ | ○ | ○ | × | ○ | × |
| 2 | 1ST | ○ | × | × | ○ | ○ | × | × | × | × | × |
| | 2ND | ○ | ○ | △ | ○ | ○ | × | × | ○ | ○ | × |
| | 3RD | × | ○ | △ | ○ | ○ | ○ | × | × | ○ | × |
| L | 1ST | ○ | × | × | ○ | ○ | × | × | × | × | ○ |
| | 2ND | ○ | ○ | × | ○ | ○ | × | × | ○ | ○ | × |

FIG. 3(A)

RELATIONSHIP BETWEEN ECU-COMMANDED TRANSMISSION POSITIONS AND ACTUAL TRANSMISSION POSITIONS

| ECU-COMMANDED<br>S1<br>S2<br>S3<br>ACTUAL | 1T<br>ON<br>OFF<br>OFF | 2T<br>ON<br>ON<br>OFF | 3T<br>OFF<br>ON<br>OFF | 4T<br>OFF<br>OFF<br>OFF | 4L<br>OFF<br>OFF<br>ON |
|---|---|---|---|---|---|
| 1T | NORMAL | 3  A | | 2 | 2 |
| 1.5T | F | | | | |
| 2T | 4  B | NORMAL | 2  C | C | C |
| 2L | | 6  F | | | |
| 2.5T | | D | | | |
| 3T | 1  D | 1 | NORMAL | 4  E | 4  F |
| 3L | | | 3  F | NORMAL | 5  A |
| 4T | | | | 6 | 3 NORMAL |
| 4L | | | | | |

HIGH ← NE → LOW

FIG. 3(B)

RELATIONSHIP BETWEEN DEFECT CAUSES AND ACTUAL TRANSMISSION SHIFTS

|   | DEFECT CAUSES | 1T | 2T | 3T | 4T | 4L |
|---|---|---|---|---|---|---|
| 1 | S1 OFF | 4T | 3T | 3T | 4T | 4L |
| 2 | S1 ON | 1T | 2T | 2T | 1T | 1T |
| 3 | S2 OFF | 1T | 1T | 4T | 4T | 4L |
| 4 | S2 ON | 2T | 2T | 3T | 3T | 3L |
| 5 | SL OFF | 1T | 2T | 3T | 4T | 4T |
| 6 | SL ON | 1T | 2L | 3L | 4L | 4L |
| A | 1ST SIDE STICKING | 1T | 1T | 3T | 4T | 4T |
| B | 2ND SIDE STICKING | 2T | 2T | 3T | 4T | 4L |
| C | 2ND SIDE STICKING | 1T | 2T | 2T | 2T | 2L |
| D | 3RD SIDE STICKING | 4T | 3T | 3T | 4T | 4L |
| E | 3RD SIDE STICKING | 1T | 2T | 3T | 3T | 3L |
| F | 4TH SIDE STICKING | 1.5T | 2.5T | 4T | 4T | 4L |

FIG. 22

S2-OFF DEFECT VERSUS 1-2SV 1ST-SIDE STICKING DEFECT

|   | DEFECTS | 1T | 2T | 3T | 4T | 4L |
|---|---|---|---|---|---|---|
| 3 | S2 OFF | 1T | 1T | 4T | 4T | 4L |
| A | 1-2SV 1ST-SIDE STICKING | 1T | 1T | 3T | 4T | 4T |

FIG. 23

S2-ON DEFECT VERSUS 3-4SV 3RD-SIDE STICKING DEFECT

|   | DEFECTS | 1T | 2T | 3T | 4T | 4L |
|---|---|---|---|---|---|---|
| 4 | S2 ON | 2T | 2T | 2T | 3T | 3L |
| E | 3-4SV 3RD-SIDE STICKING | 1T | 2T | 3T | 3T | 3L |

FIG. 24

SL-OFF DEFECT VERSUS 1-2SV 1ST-SIDE STICKING DEFECT

|   | DEFECTS | 1T | 2T | 3T | 4T | 4L |
|---|---|---|---|---|---|---|
| 5 | SL OFF | 1T | 2T | 3T | 4T | 4T |
| A | 1-2SV 1ST-SIDE STICKING | 1T | 2T | 3T | 4T | 4T |

APPARATUS FOR DIAGNOSING AUTOMATIC TRANSMISSION BASED ON ENGINE SPEED AS COMPARED WITH REFERENCE RANGE

BACKGROUND OF THE INVENTION

1. Field of the Invention

The present invention relates to a diagnosing apparatus capable of detecting a trouble or defect associated with an automatic transmission system of a motor vehicle.

2. Discussion of the Related Art

Some motor vehicles use an automatic transmission system including (a) an automatic transmission incorporating a plurality of frictional coupling devices, (b) a plurality of solenoid-operated valves which are operated according to shift commands, and (c) an electronic control device generating the shift commands for controlling the operating states of the frictional coupling devices, to automatically place the automatic transmission in a selected one of the operating positions. The operating position to be selected is specified by the shift position commands. Usually, such automatic transmission system is equipped with a detecting circuit for detecting electrical disconnection and/or short circuiting of solenoid coils of the solenoid-operated valves. The detecting circuit generates signals indicating such defects that cause a failure of the automatic transmission to normally operate according to the shift commands received from the electronic control device. However, the absence of the electrical disconnection and short circuiting of the solenoid coils of the solenoid-operated valves does not necessarily mean normal functioning of the solenoid-operated valves. For instance, the detecting circuit is not capable of detecting other troubles or defects associated with the automatic transmission system, such as sticking of plungers or spools of the valves due to foreign matters contained in the working fluid or misalignment of the plungers. Such defects lead to failure of the spools to be normally moved for controlling the frictional coupling devices.

JP-A-1-172663 discloses a diagnosing apparatus adapted to detect the input and output shaft speeds of an automatic transmission, calculate an estimated input shaft speed of the transmission on the basis of the detected output shaft speed and the gear ratio of the currently selected operating position of the transmission, and compare the estimated input shaft speed with the detected actual input shaft speed, for determining whether the automatic transmission is normally functioning.

The known diagnosing apparatus indicated above uses speed detecting means for detecting the input shaft speed of the automatic transmission, which includes, for example, a gear which rotates with the input shaft and which have teeth to be detected, and a magnetic sensor adapted to detect passage of the teeth of the gear. To provide the automatic transmission with such gear and sensor, the transmission must be modified in design. This modification tends to increase the size and weight of the transmission, and also the cost of manufacture. On the other hand, the size, weight and cost of the transmission must be minimized to meet recent requirements in the manufacture of automobiles. Although the speed of the vehicle engine may be substituted for the input shaft speed of the transmission, the engine speed generally deviates from the input shaft speed of the transmission, due to a speed difference therebetween in the presence of a fluid-actuated power transmitting device such as a torque converter usually provided in the transmission.

In other words, the use of the engine speed in place of the input shaft speed of the transmission does not assure accurate diagnosis of the automatic transmission.

The known detector or diagnosing apparatus indicated above is not capable of localizing or pin-pointing a defect or trouble detected, and requires considerable time and efforts to find out a source or cause of the defect.

SUMMARY OF THE INVENTION

It is therefore a first object of the present invention to provide a diagnosing apparatus which assure accurate and reliable detection or determination of a defect associated with an automatic transmission system of a motor vehicle, without using a sensor for detecting the speed of the input shaft of the transmission.

It is a second object of this invention to provide a diagnosing apparatus which assures accurate and reliable detection or determination of a defect of such automatic transmission system and which facilitates localization or pin-pointing of the defect.

The first object can be achieved according to a first aspect of the present invention, which provides a diagnosing apparatus for detecting a defect associated with an automatic transmission system of a motor vehicle, the automatic transmission system including (a) an automatic transmission having a plurality of operating positions, operatively connected to an engine of the vehicle through a fluid-actuated power transmitting device, and incorporating a plurality of frictional coupling devices for establishing the operating positions, (b) a plurality of solenoid-operated valves for controlling operating states of the frictional coupling devices according to shift commands, and (c) an electronic control device which generates the shift commands to place the automatic transmission in a selected one of the plurality of operating positions, depending upon a running condition of the vehicle, the diagnosing apparatus comprising: (i) engine speed detecting means for detecting a speed of the engine; (ii) range determining means for determining a reference range of the speed of the engine within which the speed of the engine is expected to fall when the automatic transmission is placed in one of the operating positions which is selected by a shift command generated by the electronic control device; (iii) condition determining means for determining whether the vehicle is placed in a predetermined running condition; and (iv) defect detecting means for determining whether there exists a defect associated with the automatic transmission system, depending upon whether the speed of the engine detected by the engine speed detecting means is held within or outside the reference range when the condition determining means determines that the vehicle is placed in the predetermined running condition.

In the diagnosing apparatus of the present invention constructed as described above, the range determining means determines the reference range of the engine speed, on the basis of the speed at which the engine is expected to operate when the operating position of the transmission selected by the shift command currently generated by the control device is established. Further, the condition determining means determines whether the vehicle is placed in the predetermined running condition that assures accurate determination of the defect detecting means. The defect detecting means operates to determine whether the automatic transmission system has a defect, depending upon whether the detected engine speed is held within or outside the determined reference range when the predetermined running condition of the vehicle is satisfied. That is, the defect detecting means detects the presence of a defect if the detected engine speed is outside the reference range while the vehicle is running in the predetermined running condition.

In the present diagnosing system, the defect detecting means operates only while the vehicle is in the running condition that permits accurate determination as to whether there exists a defect in the automatic transmission system. Accordingly, the present apparatus assures accurate and reliable determination of the presence or absence of a defect of the automatic transmission system without using a sensor for detecting the input shaft of the automatic transmission, even though the engine speed differs from the input shaft speed of the automatic transmission in the presence of the fluid-actuated power transmitting device such as a torque converter interposed between the engine and the input shaft of the automatic transmission. The elimination of the sensor for detecting the transmission input shaft speed leads to reduced size, weight and cost of manufacture of the automatic transmission system.

Preferably, the condition determining means determines the running condition of the vehicle, on the basis of at least such parameters that relate to the vehicle running speed and the commanded position of the automatic transmission, desirably together with the opening angle of the throttle valve of the engine. The condition determining means does not determine that the predetermined running condition of the vehicle is satisfied, unless all of the parameters satisfy respective requirements or are held within respective permissible ranges.

It is desirable that the defect detecting means be adapted to operate after the engine speed is stabilized.

The second object indicated above as well as the first object may be achieved according to one preferred form of the invention wherein the diagnosing apparatus further comprises (v) speed change detecting means for detecting a change in the speed of the engine in response to the shift command generated by the electronic control device, and (vi) non-defect determining means for making a determination that one of the solenoid-operated valves whose operating state should be changed to effect a shifting action of the automatic transmission according to the shift command is normally functioning, if the speed change detecting means has detected the change in the speed of the engine in response to the shift command, and wherein the defect detecting means localizes the detected defect on the basis of the determination made by the non-defect detecting means.

The second object as well as the first object may also be achieved according to another preferred form of the invention wherein the the automatic transmission system further includes a lock-up clutch which is disposed between the engine and the automatic transmission and which has an engaged position for direct connection of the engine to the automatic transmission and a released position in which an output of the engine is transmitted to the automatic transmission through the fluid-actuated power transmitting device, the automatic transmission system further including another solenoid-operated valve for placing the lock-up clutch in one of the engaged and released positions, and wherein the diagnosing apparatus further comprises: (v) second range determining means for determining another reference range of the speed of the engine within which the speed of the engine is expected to fall when the lock-up clutch is placed in the engaged position according to a lock-up command generated by the electronic control device, and (vi) a second defect detecting means for making a determination as to whether the automatic transmission system is defective, depending upon whether the speed of the engine detected by the engine speed detecting means after generation of the lock-up command is held within or outside the second reference range determined by the second range determining means. In this instance, too, the defect detecting means localizes the detected defect on the basis of the determination made by the second defect detecting means.

The second object may be achieved according to a second aspect of this invention, which provides a diagnosing apparatus for detecting a defect associated with an automatic transmission system of a motor vehicle, the automatic transmission system including (a) an automatic transmission having a plurality of operating positions and incorporating a plurality of frictional coupling devices for establishing the operating positions, (b) a plurality of solenoid-operated valves for controlling operating states of the frictional coupling devices according to shift commands, and (c) an electronic control device which generates the shift commands to place the automatic transmission in a selected one of the plurality of operating positions, the diagnosing apparatus comprising: (i) engine speed detecting means for detecting a speed of the engine; (ii) speed change detecting means for detecting a change in the speed of the engine in response to the shift command generated by the electronic control device; and (iii) non-defect determining means for determining that one of the solenoid-operated valves whose operating state should be changed to effect a shifting action of the automatic transmission according to the shift command is normally functioning, if the speed change detecting means has detected the change in the speed of the engine in response to the shift command.

In the diagnosing apparatus constructed according to the second aspect of the invention, the speed change detecting means detects a change in the engine speed in response to a shift command generated by the electronic control device. If the speed change detecting means detects a change in the engine speed, the non-defect determining means determines that the solenoid-operated valve whose operating state should be changed to shift the automatic transmission according to the shift command is normally functioning.

Thus, the non-defect determining means confirms that the solenoid-operated valve which should be operated to establish the operating position of the transmission selected by the shift command is not defective, if the engine speed has changed by an amount larger than a predetermined threshold, as a result of the shifting action of the transmission according to the shift command, namely, as a result of normal operation of the solenoid-operated valve in question. Accordingly, the present apparatus assures accurate and reliable determination of the presence or absence of a defect of the solenoid-operated valves, without using a sensor for detecting the input shaft of the automatic transmission, even though the engine speed differs from the input shaft speed of the automatic transmission in the presence of the fluid-actuated power transmitting device interposed between the engine and the input shaft of the automatic transmission. The elimination of the sensor for detecting the transmission input shaft speed leads to reduced size, weight and cost of manufacture of the automatic transmission system.

The above diagnosing apparatus preferably further comprises condition determining means for determining whether the vehicle is placed in a predetermined running condition. In this case, the non-defect determining means operates only when the condition determining means determines that the vehicle is placed in the predetermined running condition. Preferably, the condition determining means determines the running condition of the vehicle, on the basis of at least such parameters that relate to the vehicle running speed and the commanded position of the automatic transmission, desirably together with the opening angle of the throttle valve of the engine, as described above with respect to the first aspect of the invention.

It is desirable that the non-defect determining means be adapted to operate after the engine speed is stabilized.

In one preferred form of the apparatus according to the second aspect of the invention, the automatic transmission system further includes a lock-up clutch which is disposed between the engine and the automatic transmission and which has an engaged position for direct connection of the engine to the automatic transmission and a released position in which an output of the engine is transmitted to the automatic transmission through a fluid-actuated power transmitting device, the automatic transmission system further including another solenoid-operated valve for placing the lock-up clutch in one of the engaged and released positions, and where the diagnosing apparatus further comprises: range determining means for determining a reference range of the speed of the engine within which the speed of the engine is expected to fall when the lock-up clutch is placed in the engaged position according to the lock-up command generated by the electronic control device; and defect detecting means for making a determination as to whether the automatic transmission system has a defect, depending upon whether the speed of the engine detected by the speed detecting means is held within or outside the reference range determined by the range determining means. In the present arrangement, the non-defect determining means and the defect detecting means cooperate to localize the defect.

The second object as well as the first object may also be achieved according to a third aspect of this invention, which provides a diagnosing apparatus for detecting a defect associated with an automatic transmission system of a motor vehicle, the automatic transmission system including (a) an automatic transmission having a plurality of operating positions and incorporating a plurality of frictional coupling devices for establishing the operating positions, (b) a plurality of first solenoid-operated valves for controlling operating states of said frictional coupling devices according to shift commands, (c) a lock-up clutch disposed between said engine and said automatic transmission and having an engaged position for direct connection of said engine to said automatic transmission and a released position in which an output of the engine is transmitted to said automatic transmission through a fluid-actuated power transmitting device, (d) a second solenoid-operated valve for placing said lock-up clutch in a selected one of said engaged and released positions according to a lock-up command, and (e) an electronic control device which generates said lock-up command, and said shift commands to place said automatic transmission in a selected one of said plurality of operating positions, said diagnosing apparatus comprising: (i) engine speed detecting means for detecting a speed of the engine; (ii) range determining means for determining a reference range of the speed of the engine within which the speed of the engine is expected to fall when the the lock-up clutch is placed in the engaged position according to a lock-up command generated by the electronic control device; and (iii) defect detecting means for determining whether the automatic transmission system is defective, depending upon whether the speed of the engine detected by the engine speed detecting means is held within or outside the reference range.

In the present diagnosing apparatus according to the third aspect of the present invention, the range determining means determines a reference range of the engine speed within which the engine speed is expected to fall when the lock-up clutch is placed in the engaged position according to the lock-up command generated by the electronic control device. The defect detecting means determines the presence of a defect of the automatic transmission system, if the engine speed after generation of said lock-up command is outside the reference range.

The present diagnosing apparatus adapted to detect a defect of the automatic transmission system depending upon whether the detected engine speed is outside the reference range is also capable of accurately determining the presence of a defect without using a sensor for detecting the input shaft speed of the automatic transmission. Accordingly, the present apparatus does not increase the size, weight and cost of manufacture of the automatic transmission system.

In one preferred form of this third aspect of the invention, the diagnosing apparatus further comprises condition determining means for determining whether the vehicle is placed in a predetermined running condition. In this instance, the defect detecting means operates when the condition determining means determines that the vehicle is placed in the predetermined running condition.

Preferably, the condition determining means determines the running condition of the vehicle, on the basis of at least such parameters that relate to the vehicle running speed and the commanded position of the automatic transmission, desirably together with the opening angle of the throttle valve of the engine. The condition determining means does not determine that the predetermined running condition of the vehicle is satisfied, unless all of the parameters satisfy respective requirements or are held within respective permissible ranges. It is desirable that the defect detecting means be adapted to operate after the engine speed is stabilized.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 2 is a view indicating operating states of clutches, brakes and solenoid-operated valves in relation to the operating positions of the transmission of FIG. 1;

FIG. 3(A) is a view indicating a relationship between commanded and actual positions of the transmission of FIG. 1, and FIG. 3(B) is a view indicating a relationship between possible defects associated with the transmission system and actual shifting errors of the transmission due to such defects;

FIG. 22 is a view indicating different shifting errors of the transmission in the presence an OFF-state defect of a second solenoid-operated valve S2 and a 1st-side sticking defect of a 1-2 shift valve of a hydraulic control device provided in the control system of FIG. 1;

FIG. 23 is a view indicating different shifting errors of the transmission in the presence of an ON-state defect of the second solenoid-operated valve and a 3rd-side sticking defect of a 3-4 shift valve of the hydraulic control device; and FIG. 24 is a view indicating different shifting errors of the transmission in the presence of an OFF-state defect of a third solenoid-operated valve and a 1st-side sticking defect of the 1-2 shift valve.

DETAILED DESCRIPTION OF THE PREFERRED EMBODIMENTS

Figure 1:
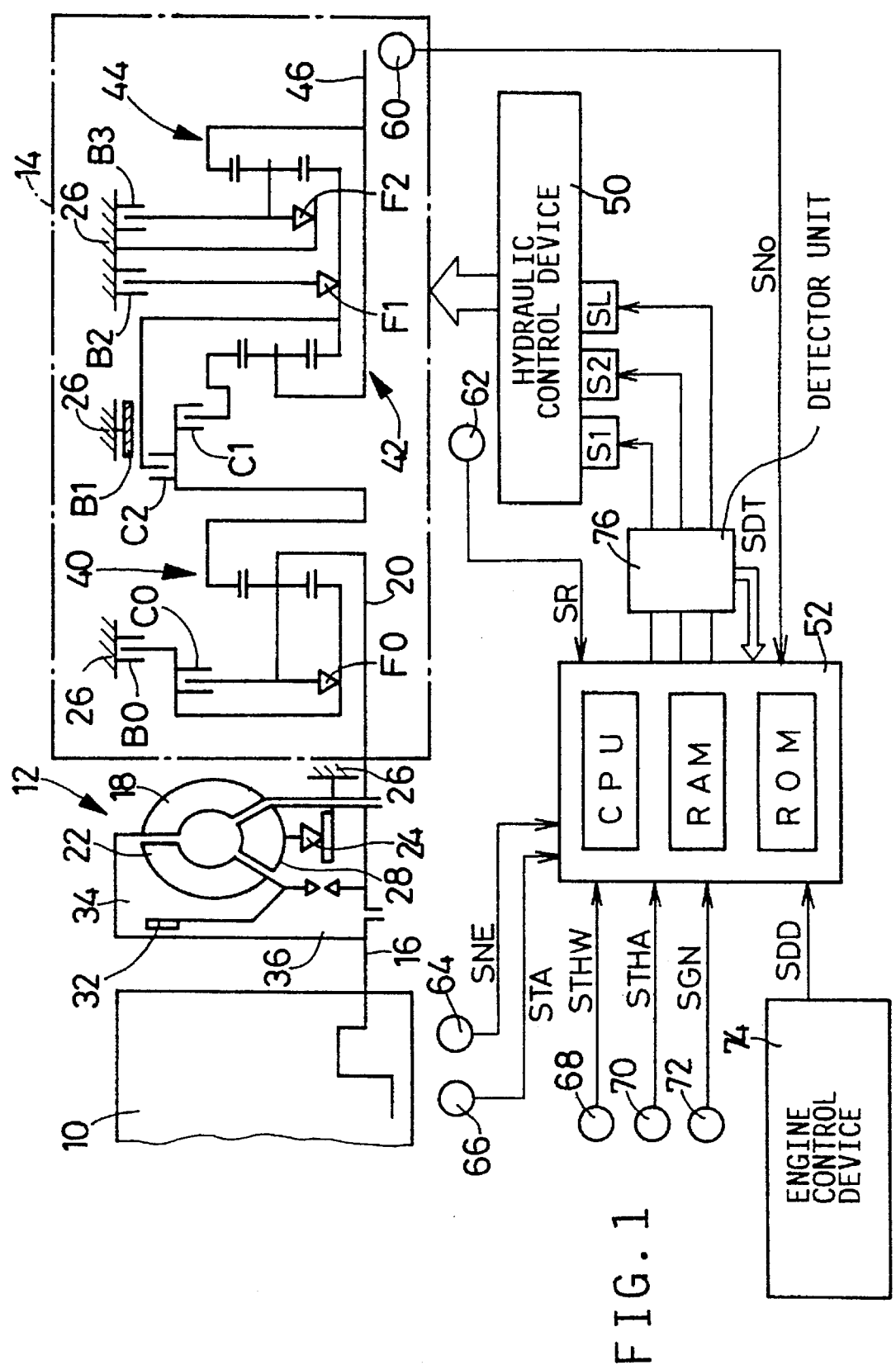
FIG. 1 is a schematic view illustrating a vehicle automatic transmission system including an automatic transmission and, a control system for the transmission, which incorporates one embodiment of a diagnosing apparatus of the present invention.

Referring first to FIG. 1, there is shown an internal combustion engine 10 of a motor vehicle. An output of the engine 10 is transmitted to drive wheels of the vehicle through a fluid-actuated power transmitting device in the form of a torque converter 12, an automatic transmission 14 and a well known differential gear device. The torque converter 12 includes a pump impeller 18 connected to a crankshaft 16 of the engine 10, a turbine impeller 22 connected to an input shaft 20 of the transmission 14, a stator impeller 28 fixed via a one-way clutch 24 to a stationary member in the form of a housing 26, and a lock-up clutch 32 connected to the input shaft 20 via a damper.

The torque converter 12 has an engaging oil chamber 34 and a releasing oil chamber 36. When the pressure in the releasing oil chamber 36 is higher that that in the engaging oil chamber 34, the lock-up clutch 32 is placed in a released state in which a torque is transmitted through the torque converter 12 at a boosting ratio corresponding to an input/output speed ratio of the torque converter 12. When the pressure in the engaging oil chamber 34 is higher than that in the releasing oil chamber 36, the lock-up clutch is placed in an engaged state in which the crankshaft 16 of the engine 10 is directly connected to the input shaft 20 of the transmission 14 through the lock-up clutch 32.

The automatic transmission 14 has three single pinion type planetary gear sets 40, 42 and 44 which are disposed coaxially with each other. The automatic further has an output shaft 46 as well as the input shaft 20. The output shaft 46 is connected to a carrier of the second planetary gear set 42 and a ring gear of the third planetary gear set 44. The first, second and third planetary gear sets 40, 42, 44 have elements which are integrally connected to each other, and elements which are selectively connected to each other by three clutches C0, C1 and C2 or selectively fixed to the housing 26 by four brakes B0, B1, B2 and B3. The transmission 14 also has three one-way clutches F0, F1 and F2, and the planetary gear sets 40, 42, 44 have elements which are connected to each other or to the housing 26 by the one-way clutches F0, F1 and F2, depending upon the directions of rotation of those elements.

Since the torque converter 12 and automatic transmission 14 are constructed symmetrically with respect to the axes, lower halves of these devices 12, 14 are omitted in the schematic view of FIG. 1.

The clutches C0–C2 and brakes B0–B3, which are collectively referred to as "clutches C" and "brakes B", respectively, are hydraulically operated frictionally coupling devices such as multiple disk clutches and band brakes, which include respective hydraulic actuators. These hydraulic actuators are supplied with a pressurized fluid delivered from a hydraulic control device 50. As well known in the art and as disclosed in JP-A-2-80851, for example, the hydraulic control device 50 incorporates a plurality of shift control valves including a 1–2 shift valve (1–2 SV), a 2–3 shift control valve (2–3SV) and a 3–4 shift control valve (3–4SV).

These shift control valves are controlled by a first, a second and a third solenoid-operated valve S1, S2 and SL. These solenoid-operated valves S1, S2, SL are turned ON and OFF according to control signals from an electronic control device in the form of an electronic control unit (ECU) 52, to control the shift control valves for thereby controlling the hydraulic actuators for selective engagement or disengagement of the clutches C and brakes B, so that the transmission 14 is placed in one of four operating positions for forward running of the vehicle. As indicated in FIG. 2, the forward running positions consist of a first-speed position (1st), a second-speed position (2nd), a third-speed position (3rd) and a fourth-speed or overdrive position (O/D).

The automatic transmission 14, hydraulic control device 50 and electronic control unit 52 constitute a major portion of an automatic transmission system. The control unit 52 cooperate with various sensors described below to function as a diagnosing apparatus constructed according to the principle of the invention for detect or determine defects of the solenoid-operated valves S1, S2, SL and the associated shift valves of the hydraulic control device 50, which defect cause erroneous shifting actions or shifting errors of the transmission 14, as discussed below in detail.

The motor vehicle is provided with a shift lever which has a DRIVE position (D), a SECOND position (2) and a LOW position (L). In the DRIVE position (D), the transmission 14 may be placed in one of the four operating positions (1st through O/D). In the SECOND position (2), the transmission 14 may be placed in one of the three operating positions, from 1st through 3rd. In the LOW position (L), the transmission 14 may be placed in one of the two operating positions, either 1st or 2nd. The shift lever indicated above is linked with a manual shift valve, which is adapted to engage the brakes B1 and B2 when the transmission 14 is placed in the second-speed position (2nd) with the shift lever placed in the SECOND position (2) or LOW position (L), or in the first-speed position (1st) with the shift lever placed in the LOW position (L). In the column of the solenoid-operated valves S1, S2 and SL in the table of FIG. 2, "o" and "x" marks indicate energization (ON) and de-energization (OFF) of the valves S1 and S2, respectively, while "Δ" indicates energization (ON) of the valve SL (for engaging the lock-up clutch 32). In the columns of the clutches C and brakes B, the "o" and "x" marks indicate the energization and de-energization of the valves, respectively.

The 1–2 shift valve has a spool which is moved by hydraulic signals from the first and second solenoid-operated valves S1 and S2, to control the brake B2 for switching between the first-speed and second-speed positions (1st and 2nd) when the shift lever is placed in the DRIVE position (D), for example. The 2–3 shift valve has a spool which is moved by hydraulic signals from the solenoid-operated valves S1, S2, to control the clutch C2 for switching between the second-speed and third-speed positions (2nd and 3rd) when the shift lever is placed in the DRIVE position (D), for example. The 3–4 shift valve has a spool which is moved by hydraulic signals from the valves S1, S2, to control the brake B0 for switching between the third-speed and fourth-speed positions (3rd and O/D), for example.

Referring back to FIG. 1, the electronic control device 52 incorporates a central processing unit (CPU), a random-access memory (RAM), a read-only memory (ROM) and input and output interface circuits. The CPU operates to process input signal according to control programs stored in the ROM while utilizing a temporary data storage function of the RAM, for suitably energizing and de-energizing (turning ON and OFF) the first and second solenoid-operated valves S1, S2 to shift the transmission 14 as needed according to shift commands, and energizing and de-energizing the third solenoid-operated valve SL to engage or release the lock-up clutch 32 according to a lock-up command. The transmission 14 is shifted down or up depending upon the running condition of the vehicle, more specifically, depending upon a detected opening angle TA of a throttle valve and a detected vehicle speed V, and according to predetermined shift patterns or shift-boundary lines, which represent predetermined relationships between the throttle opening angle TA and the vehicle speed V. Namely, the operating position of the transmission 14 to be established is determined by the detected throttle opening angle TA and vehicle speed V according to the predetermined TA-V patterns, and the determined position is established by suitably controlling the first and second solenoid-operated valves S1 and S2. The lock-up clutch 32 is selectively placed in the engaged or released position, depending upon the detected throttle opening angle TA and vehicle speed V, and according to a predetermined TA-V relationship. The lock-up clutch 32 is engaged and released by energizing and de-energizing the third solenoid-operated valve SL.

As described below in detail, the electronic control device 52 also performs diagnosing operations to detect defects associated with the automatic transmission system.

The electronic control device 52 receives various input signals from various sensors such as an output speed sensor 60, a shift position switch 62, an engine speed sensor 64, a throttle sensor 66, a water temperature sensor 68, an intake air temperature sensor 70 and an intake air quantity sensor 72. The output speed sensor 60 generates an OUTPUT SPEED signal SNO representative of a speed NO of the output shaft 46 of the transmission 14. The vehicle speed V may be obtained from the output shaft speed NO. The switch 62 is disposed adjacent the manual shift valve linked with the shift lever, and generates a SHIFT POSITION signal SR representative of the currently selected position (D, 2, L) of the shift lever. The engine speed sensor 64 generates an ENGINE SPEED signal SNE representative of a speed NE of the engine 10. The throttle sensor 66 generates a THROTTLE ANGLE signal STA representative of the throttle opening angle TA of the throttle valve of the engine 10. The water temperature sensor 68 generates a WATER TEMP. signal STHW representative of a temperature THW of a coolant of the engine 10. The intake air temperature sensor 70 generates an INTAKE AIR TEMP. signal STHA representative of an intake air temperature THA of the engine 10. The intake air quantity sensor 72 generates an INTAKE AIR QUANTITY signal SGN representative of an intake air quantity GN of the engine 10.

An electronic engine control device 74 is connected to the electronic control unit 52, and provides the control unit 52 with a LEARNING signal SAGKNK representative of a learning value AGKNK for engine knocking control, and DIAGNOSIS signal SDD representative of various diagnostic data DD. A detector unit 76 is provided to detect electrical disconnection and short circuiting of the solenoid coils of the first, second and third solenoid-operated valves S1, S2, SL. The detector unit 76, which is also connected to the electronic control unit 52, generates a signal SDT indicative of electrical disconnection or short circuiting of the valves S1, S2, SL.

Reference is now made to tables of FIGS. 3(A) and 3(B). The table of FIG. 3(A) indicates a relationship between the positions of the transmission 14 commanded by the electronic control unit (ECU) 52 and the positions in which the transmission 14 is actually placed. The table of FIG. 3(B) indicates a relationship between possible defects associated with the transmission 14 and actual shifts of the transmission 14. In FIGS. 3(A) and 3(B) and the following description, 1T, 2T, 3T and 4T indicate the first-speed, second-speed, third-speed and fourth-speed (overdrive) positions (1st, 2nd, 3rd and O/D) of the transmission 14, respectively, when the lock-up clutch 32 is placed in the released state (when the torque convertor 12 is in the operative position). On the other hand, 1L, 2L, 3L and 4L indicate those positions of the transmission 14 when the lock-up clutch 32 is in the engaged state (when the torque converter 12 is in the inoperative position).

Figures 4A, 4B:
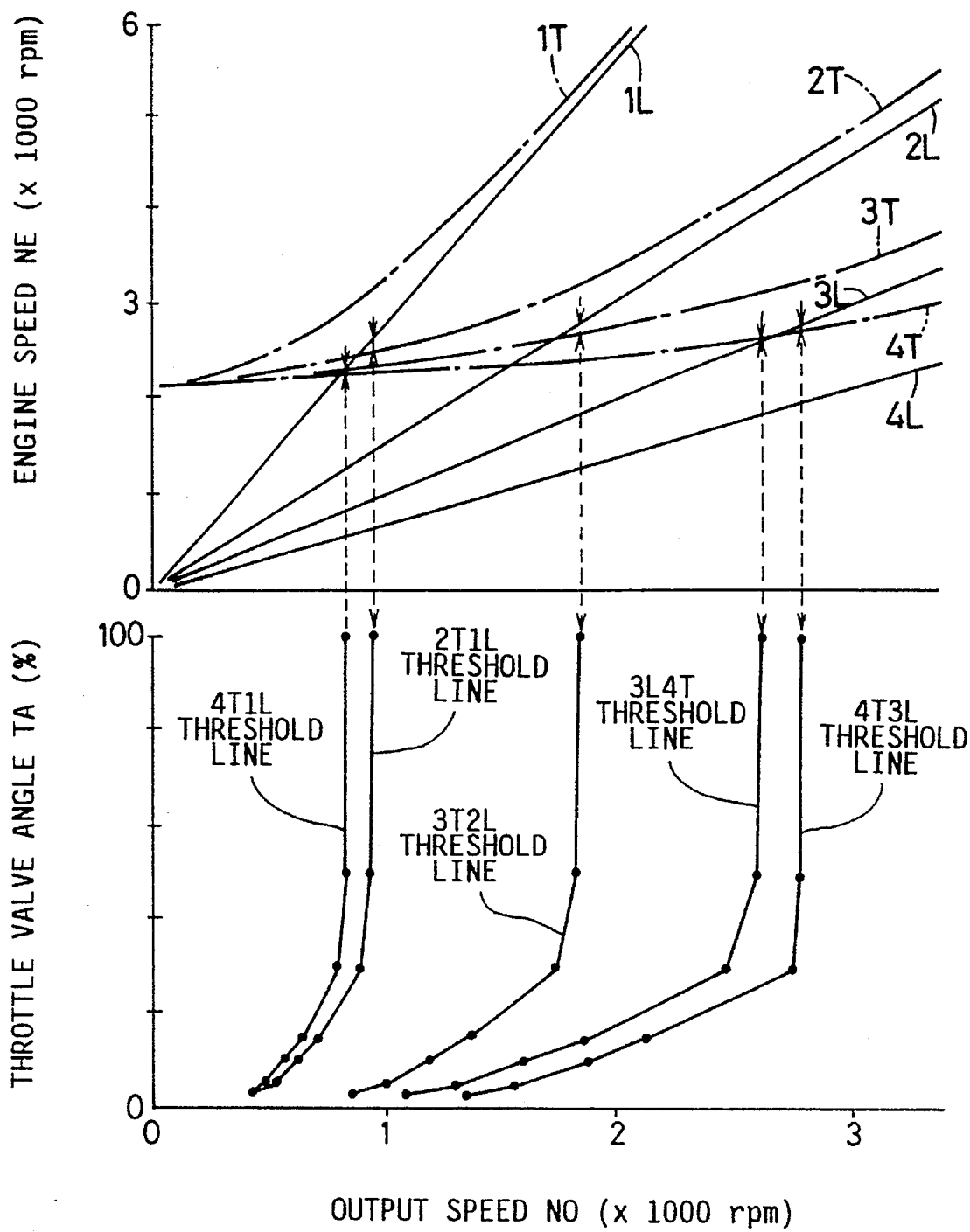
FIG. 4, comprising of FIGS. 4A and 4B, is a graph for explaining threshold lines for detecting the currently established position of the transmission on the basis of an engine speed NE.

Referring to FIG. 4, there are shown threshold lines of the engine speed NE which are used to diagnose the transmission 14. In the upper graph, solid lines represent relationships between the engine speed NE and the output shaft speed NO of the transmission 14 when the transmission 14 is placed in the positions 1L, 2L, 3L and 4L, respectively, while broken-lines represent relationships between the same NE-NO relationships when the throttle valve opening angle TA is 100% and when the transmission 14 is placed in the positions 1T, 2T, 3 T and 4T, respectively. As the throttle valve opening TA is reduced from the 100% level, the broken lines for the positions 1T through 4T are moved toward the corresponding solid lines for the positions 1L through 4L. For example, the broken line for the position 1T and the solid line for the position 1L define an area in which the engine speed NE may vary as the throttle opening angle TA and the output shaft speed NO change when the transmission 14 is placed in the first-speed position (1st). Similarly, the broken and solid lines for the positions 2T and 2L define an area in which the engine speed NE may vary when the transmission 14 is placed in the second-speed position (2nd). These two areas are separated or spaced from each other in the direction of the engine speed NE when the output shaft speed NO is higher than the level corresponding to an intersection point of the solid line for the position 1L and the broken line for the position 2T. Therefore, the engine speed NE can be used to determine whether the transmission 14 is currently placed in the first-speed position position (1T, 1L) or second-speed position (2T, 2L), if the currently detected output shaft speed NO is higher than the level indicated above. Thus, the currently selected position of the transmission 14 can detected on the basis of the detected engine speed NE under a predetermined condition (e.g., lower limit of the output shaft speed NO).

The lower graph in FIG. 4 shows five threshold lines each indicating a relationship between the throttle opening angle TA, and the output shaft speed NO which is higher or lower by about 100 r.p.m.(revolutions per minute) than the level corresponding to the intersection point indicated above. The output shaft speed NO represented by the 3L4T threshold line (used in an engine braking mode of the vehicle) is lower by about 100 r.p.m. than the level corresponding to the intersection point. The output shaft speeds NO represented by the other threshold lines 4T1L, 2T1L, 3T2L and 4T3L are higher by about 100 r.p.m. than the above level. This shift or offset of the threshold lines from the intersection points in the direction of the output shaft speed NO is intended to prevent erroneous determination of the currently established position of the transmission 14.

The 4T1L threshold line represents a lower limit of the output shaft speed NO when the positions 4T and 1L are discriminated from each other on the basis of the engine speed NE. The 2T1L threshold line represents a lower limit of the output shaft speed NO when the positions 2T and 1L are discriminated from each other on the basis of the engine speed NE. Similarly, the 3T2L threshold line and the 4T3L threshold line represent lower limits of the output shaft speed NO when the appropriate two positions are discriminated from each other. As indicated above, the 3L4T threshold line is used to discriminate the positions 4T and 3L when the vehicle is running in the engine braking mode.

Figure 5:
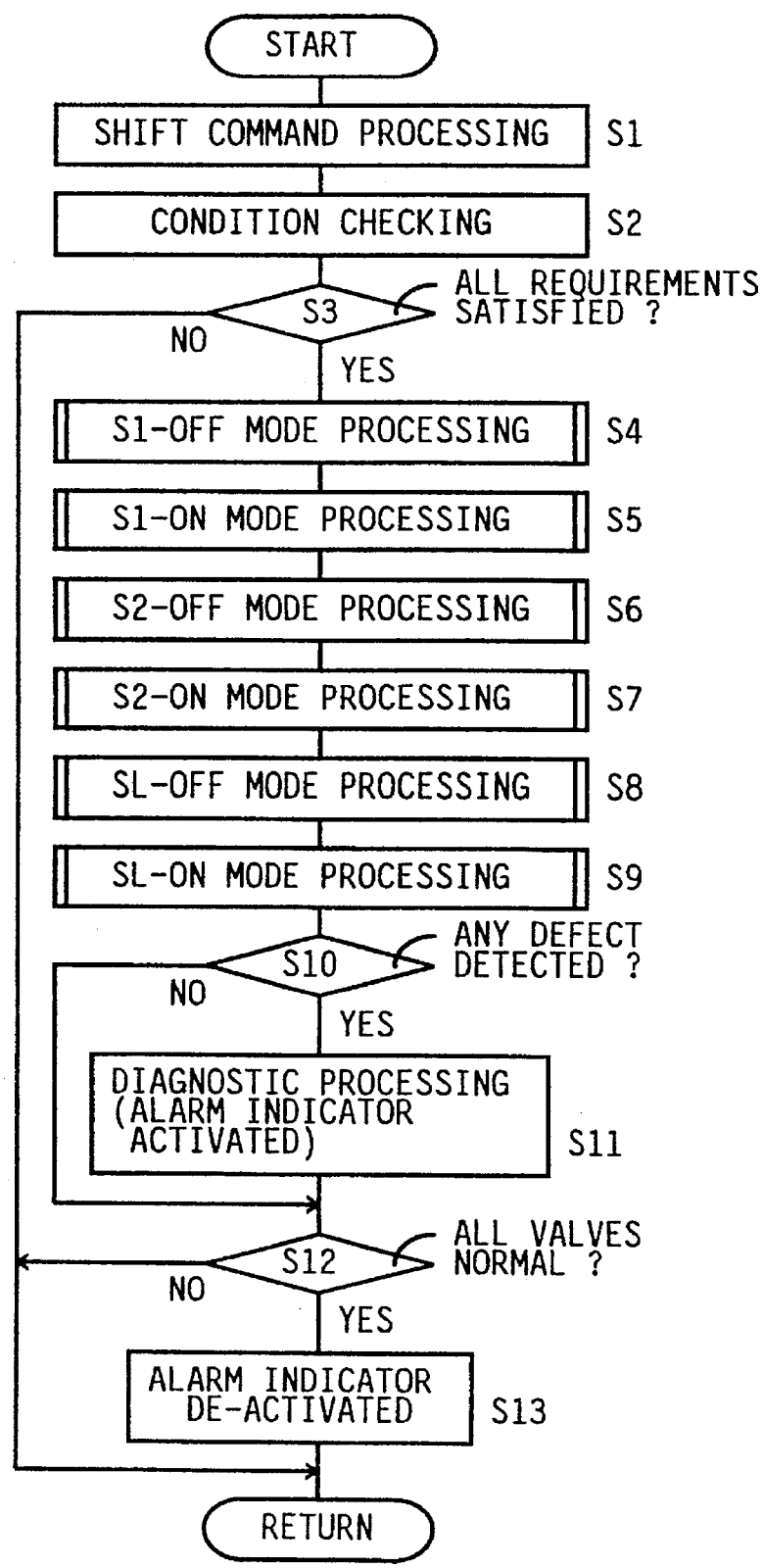
FIG. 5 is a flow chart illustrating a main diagnosing routine executed by an electronic control unit used in the control system of FIG. 1.

Referring next to the flow chart of FIG. 5, there will be described a main routine executed by the electronic control unit 52 for performing the diagnosing operations to detect defects and confirm normal functioning of the hydraulic control device 50 and the solenoid-operated valves S1, S2, SL. The diagnosing routine of FIG. 5 is initiated with step S1 to effect a shift command processing for inhibiting the diagnosing operation in a transient state of the transmission 14, that is, during a period immediately after a shift command to shift the transmission 14 is generated from the electronic control device 52. The shift command processing assures that the control flow goes to step S2 only after a predetermined time has passed after the shift command is generated.

Step S2 is implemented to check predetermined conditions of the vehicle for confirming that the vehicle is in a steady running state with the engine 10 operating in a stable state. This step S2 and the following step S3 are provided to assure accurate diagnosis of the hydraulic control device 50 and valves S1, S2, SL. For instance, step S2 is formulated to monitor the vehicle as to:

1) whether a predetermined time has passed after a start of running of the vehicle;

2) whether the engine coolant temperature THW is held within a predetermined range;

3) whether the engine control device 74 and the electronic control unit 52 are normally functioning; and 4) whether the valves S1, S2 and SL are normally functioning without electrical disconnection or short circuiting of the solenoid coils.

It will be understood that the diagnosing routine of FIG. 5 is to detect defects associated with the transmission system, other than the electrical disconnection and short circuiting of the solenoid-operated valves S1, S2, SL.

Figure 6:
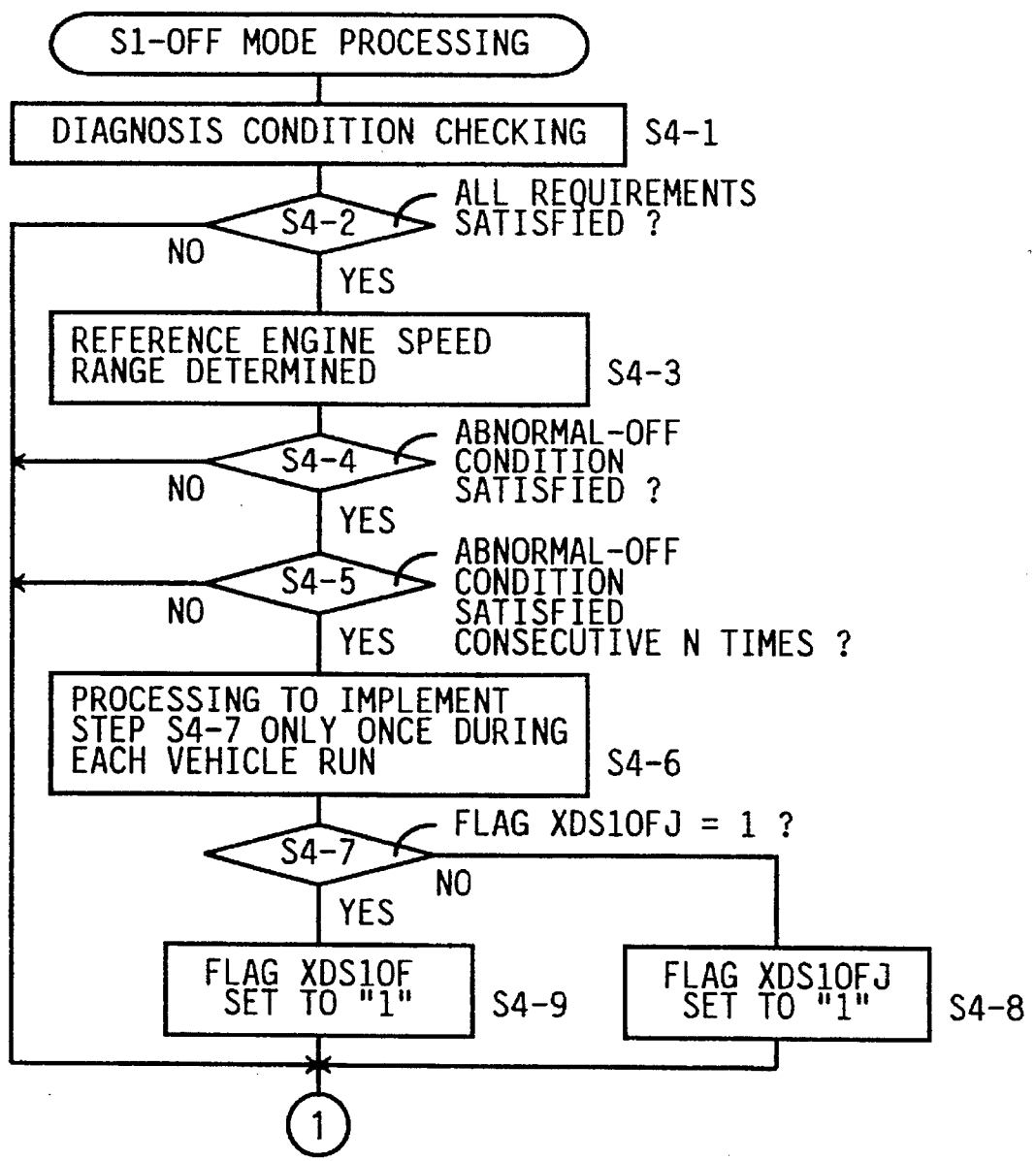
FIGS. 6 and 7 are flow charts illustrating a sub-routine executed in step S4 of the main routine of FIG. 5.
Figure 7:
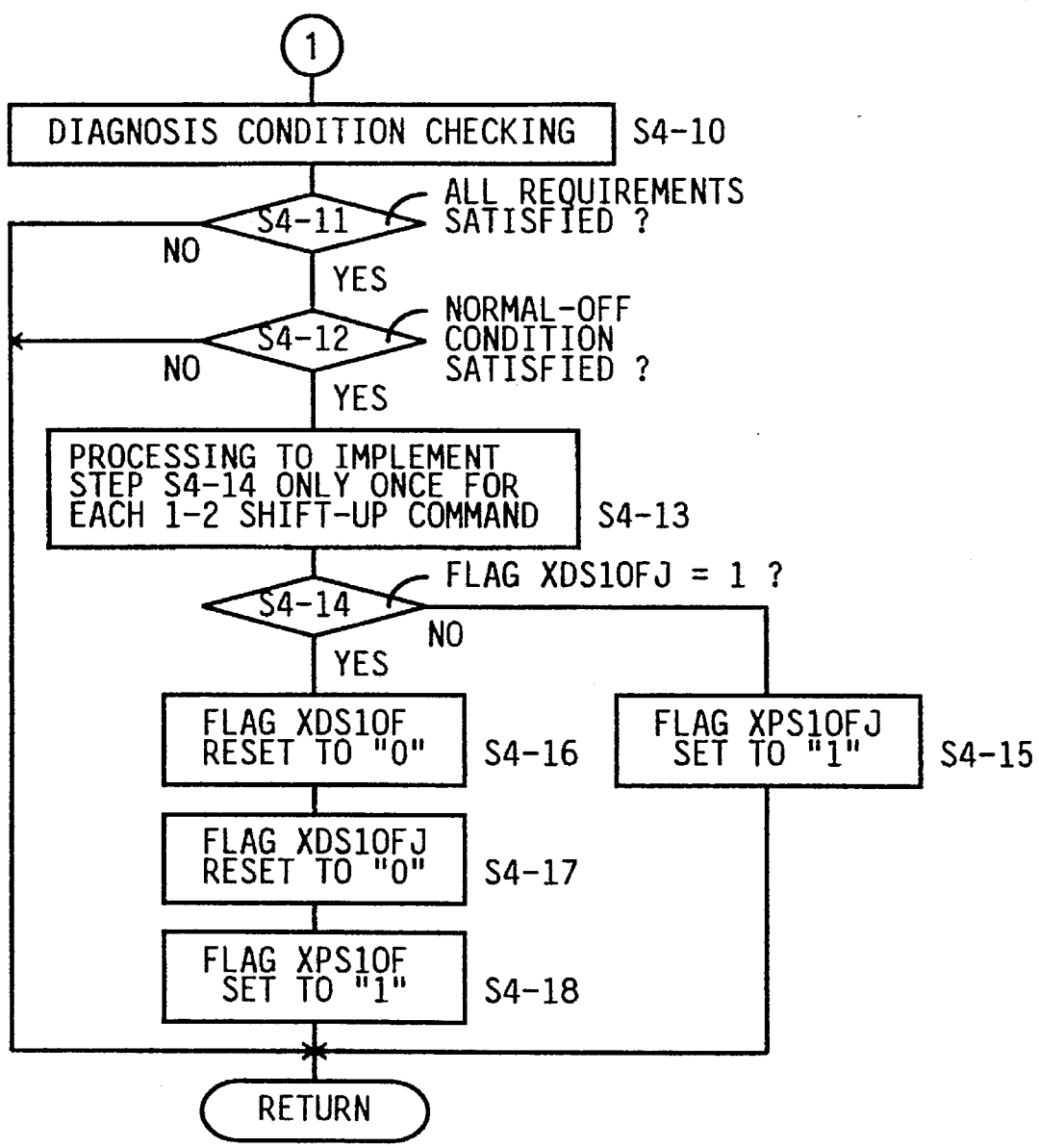

Step S2 is followed by step S3 to determine whether all conditions checked in step S2 are satisfied or not. If a negative decision (NO) is obtained in step S3, one cycle of execution of the routine of FIG. 5 is terminated. If an affirmative decision (YES) is obtained in step S3, the control flow goes to step S4 to execute an S1-OFF mode processing sub-routine illustrated in the flow charts of FIGS. 6 and 7. The S1-OFF mode processing sub-routine consists of a diagnosis as indicated in FIG. 6 to determine whether the plunger of the first solenoid-operated valve S1 is abnormally kept in its OFF position (i.e., whether an S1-OFF defect exists), and a diagnosis as indicated in FIG. 7 to determine whether the plunger of the valve S1 can be normally moved from its OFF position to its ON position (i.e., whether the S1-OFF defect has been removed). For instance, the S1-OFF defect is caused by sticking of the plunger of the valve S1.

The diagnosis of FIG. 6 is initiated with step S4-1 which corresponds to means for determining whether the vehicle is in a predetermined running condition which permits accurate determination on the basis of the engine speed NE, as to whether the plunger of the valve S1 is abnormally held in its OFF position, that is, as to whether there exists a defect associated with the transmission system. For example, the vehicle is considered to be in the predetermined running condition if the following five requirements are satisfied:

(a) The output shaft speed NO should be higher than a predetermined threshold level $NO_1$, and the throttle opening angle TA should be larger than a predetermined threshold value $TA_1$.

(b) The intake air quantity GN of the engine 10 should be larger than a predetermined threshold value $GN_1$.

(c) A flag XCS2ON (which will be described with respect to step S7-7 of FIG. 13) should not be set at "1" which indicates that the plunger of the second solenoid-operated valve S2 is abnormally kept in its ON position.

(d) A shift command for shifting the transmission 14 to the 1st-speed position (1st) should be generated by the electronic control unit 52.

(e) A time length CMEH after a start of a run of the vehicle should be shorter than a predetermined threshold $CMEH_1$.

As indicated in FIG. 3(B), if the plunger of the valve S1 is abnormally kept in its OFF position due to sticking, for example, the transmission 14 is shifted to the fourth-speed position (4T) even if the transmission is commanded to be shifted to the first-speed position (1T). When the five requirements indicated above are all satisfied, that is, when the vehicle is placed in the predetermined running condition, it is possible to check if the transmission has been shifted to the fourth-speed position when it is commanded to be shifted to the first-speed position, namely, to determine whether the plunger of the valve S1 is abnormally kept in its OFF position for some reason (e.g., sticking) other than electrical disconnection of the solenoid coil.

Figure 8A:
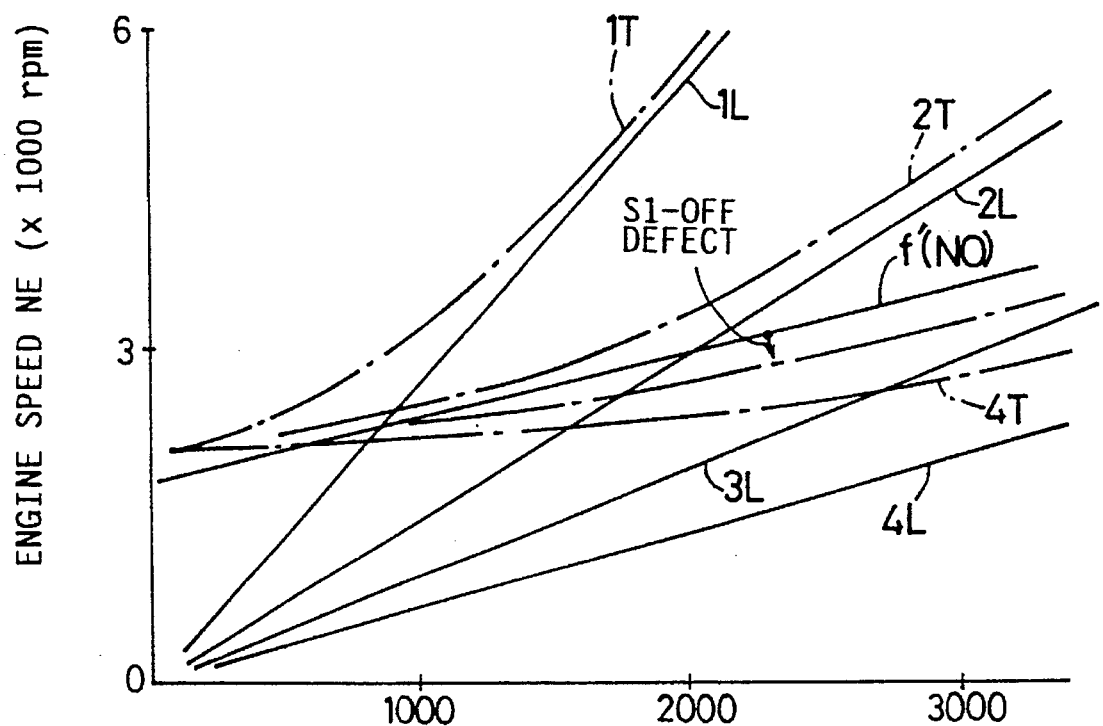
FIG. 8, comprising of FIGS. 8A and 8B, is a graph for explaining a detection area in the sub-routine of FIG. 6.
Figure 8B:
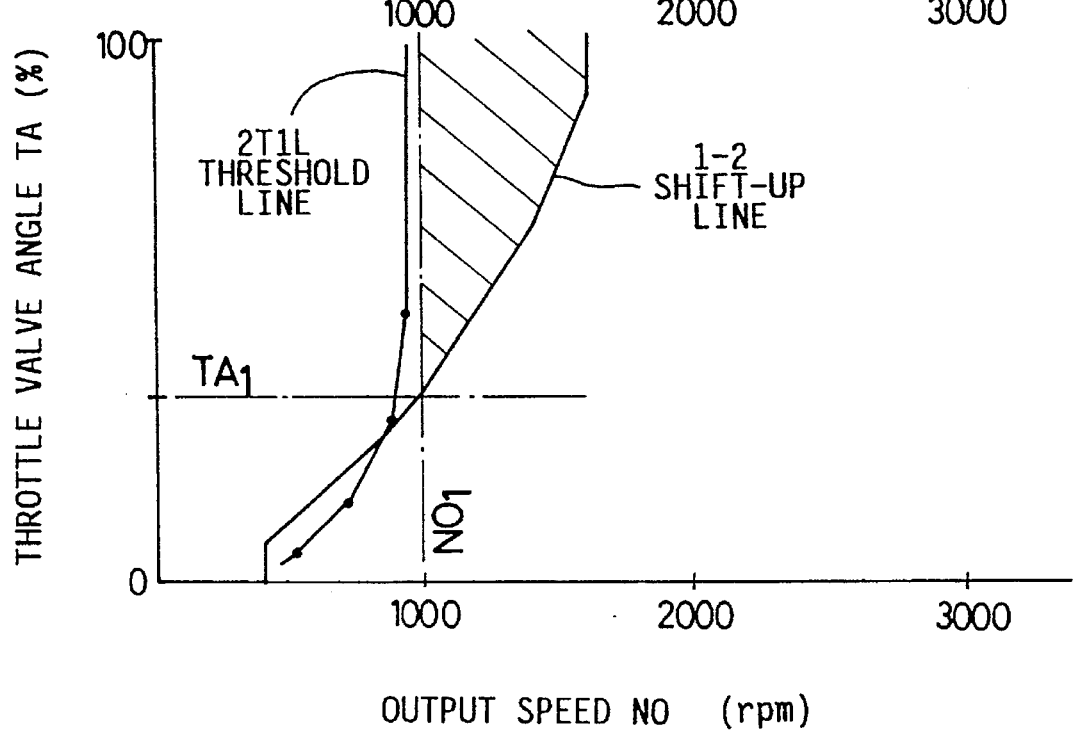

The above requirement (a) is formulated to permit determination as to whether the transmission 14 is placed in the first-speed position 1L with the lock-up clutch 32 placed in the engaged position, or in the fourth-speed position 4T with the lock-up clutch 32 placed in the released position. For instance, the threshold $NO_1$ is selected at 1000 r.p.m., which is sufficiently higher than the lower limit represented by the 4T1L threshold line and is higher by a suitable amount than the lower limit represented by the 2T1L threshold line, as indicated in FIG. 8. On the other hand, the threshold $TA_1$ is set at a value that necessarily causes the engine speed NE to exceed a threshold engine speed value $f^1$ (NO) under any operating condition (provided all the other requirements indicated above are met), if the transmission 14 is placed in the first-speed position. For example, the threshold $TA_1$ is selected at 35%. If the requirement (a) and the above requirement (d) are satisfied, there is defined a TA-NO relationship area as indicated by hatching in FIG. 8.

The above requirement (b) is provided to avoid the present diagnosis of FIG. 6 while the vehicle is running at a relatively high altitude, namely, to permit the diagnosis only when the intake air quantity GN is sufficient in relation to the output torque of the engine 10. For instance, the threshold $GN_1$ is selected at about 0.55 g/rev. when an air conditioner of the vehicle is in operation, and about 0.4 g/rev. when the air conditioner is not in operation. The requirement (e) is provided to effect the diagnosis while the vehicle is in a starting process.

Then, the control flow goes to step S4-2 to determine whether all of the five requirements (a) through (e) are satisfied. If a negative decision (NO) is obtained in step S4-2, one cycle of execution of the diagnosis of FIG. 6 is terminated, and the control flow goes to step S4-10 of the diagnosis of FIG. 7. If an affirmative decision (YES) is obtained in step S4-2, the control flow goes to step S4-3 to determine the threshold engine speed value $f^1$(NO) which has been indicated above with respect to the threshold value $TA_1$. The threshold valve $f^1$(NO) is determined on the basis of the detected output shaft speed NO. This step S4-3 corresponds to means for determining a reference range of the engine speed NE within which the engine speed NE is expected to fall while the transmission 14 is placed in the first-speed position selected by the shift command generated from the electronic control unit 52.

The reference range of the engine speed NE is determined by the threshold engine speed value $f^1$(NO) such that the threshold value $f^1$(NO) defines the lower limit of the range. The lower limit $f^1$(NO) is determined to determine that the transmission 14 is placed in the first-speed position (1L) if the engine speed NE is higher than the lower limit (is held within the reference range), while the transmission 14 is placed in the fourth-speed position (4T) if the engine speed NE is lower than the lower limit (is not held within the reference range). To this end, a threshold line defining the threshold engine speed value or lower limit $f^1$(NO) is located between the NE-NO line for the position 1L and the NE-NO line for the position 4T, as indicated in FIG. 8. However, the threshold line of the lower limit $f^1$ (NO) is preferably as close as possible to the line for the position 4T, but should be spaced from this line (in the upper direction as seen in FIG. 8) by an amount which is sufficient to accommodate a variation in the engine speed NE due to fluctuating factors at the time of determination as to whether the detected engine speed NE is held within the predetermined reference range whose lower limit is defined by the threshold line of the lower limit $f^1$(NO). In the present embodiment, the threshold line of the lower limit $f^1$(NO) as indicated in FIG. 8 is determined by experiment. The lower limit $f^1$(NO) determining the determined reference range of the engine speed NE is stored in the RAM of the control unit 52.

Step S4-3 is followed by step S4-4 to determine whether an abnormal-OFF condition of the valve S1 is satisfied, that is, whether the engine speed NE detected by the engine speed sensor 64 is lower than the lower limit $f^1$(NO), namely, outside the predetermined reference range. If the engine speed NE is lower than the lower limit $f^1$(NO), this means that the transmission 14 is placed in the fourth-speed position although it is commanded to be shifted to the first-speed position, that is, the plunger of the solenoid-operated valve S1 is abnormally held in its OFF position, while the valve S1 has been commanded to be operated to the ON position to place the transmission 14 in the first-speed position.

If a negative decision (NO) is obtained in step S4-4, one cycle of execution of the diagnosis of FIG. 6 is terminated. If an affirmative decision (YES) is obtained in step S4-4, the control goes to step S4-5 to determine whether the abnormal-OFF condition of the valve S1 has been satisfied consecutive N times, that is, whether the affirmative decision (YES) has been obtained in step S4-4 a predetermined number (N) of times consecutively, for instance five times. In other words, for example, an affirmative decision (YES) is obtained in step S4-5 if the affirmative decision (YES) is obtained in step S4-4 in each of the five consecutive cycles of execution of the sub-routine of FIGS. 6 and 7. If a negative decision (NO) is obtained in step S4-5, one cycle of execution of the diagnosis of FIG. 6 is terminated. If an affirmative decision (YES) is obtained in step S4-5, the control flow goes to step S4-6 to effect a processing that permits the following step S4-7 to be implemented only once during each run of the vehicle. In this respect, a run of the vehicle is defined as a continuous run between a start and a stop thereof while the engine 10 is in operation. Then, step S4-7 is implemented to determine whether a PRELIMINARY S1-OFF DEFECT flag XDS1OFJ is set at "1". In the first run of the vehicle after the start of the engine 10, a negative decision (NO) is obtained in step S4-7, and the control flow goes to step S4-8 to set the flag XDS1OFJ to "1". Step S4-8 is followed by the diagnosis of FIG. 7.

If an affirmative decision (YES) is obtained in step S4-5 during the second run of the vehicle after stopping of the first run, an affirmative decision (YES) is obtained in step S4-7 since the PRELIMINARY S1-OFF DEFECT flag XDS1OFJ was set to "1" in step S4-8 during the first vehicle run. In this case, step S4-7 is followed by step S4-9 in which an S1-OFF DEFECT flag XDS1OF is set to "1". In the present embodiment, steps S4-4 and S4-9 correspond to defect detecting means for determining the presence of a defect associated with the automatic transmission system, if the detected engine speed NE is not held within the predetermined reference range (the lower limit of which is the determined threshold value $f^1$(NO)), after a shifting operation of the transmission according to a shift command when the vehicle is placed in predetermined condition (when the affirmative decision is obtained in step S4-2). That is, a defect that the plunger of the first solenoid-operated valve S1 is abnormally kept in the OFF position is detected if the engine speed NE is lower than the threshold level or lower limit $f^1$(NO).

The diagnosis of FIG. 6 is followed by the diagnosis of FIG. 7, which is initiated with step S4-10 which corresponds to means for determining whether the vehicle is in a predetermined running condition which permits accurate determination on the basis of the engine speed NE, as to whether the plunger of the valve S1 can be moved from the OFF position to the ON position, that is, whether the S1-OFF defect has been removed. To make this determination, the electronic control device 52 generates a shift command to shift the transmission 14 from the first-speed position to the second-speed position. If the plunger of the first solenoid-operated valve S1 can be normally moved to the ON position, the transmission 14 is actually shifted according to the shift command from the first-speed position to the second-speed position. If the plunger of the valve S1 cannot be moved to the ON position (remains in the OFF position), the shift command will cause the transmission to be shifted from the fourth-speed position to the third-speed position because the valve S1 is OFF while the valve S2 is ON (see FIG. 2). If the transmission 14 is actually shifted from the first-speed position to the second-speed position, there should arise a considerable decrease in the engine speed NE. This fact is utilized to diagnose the valve S1 to check if the plunger of the valve S1 can be moved from the OFF position to the ON position.

For instance, the vehicle is placed in the predetermined condition for permitting the diagnosis of FIG. 7 if the following four requirements are all satisfied:

(a) A 1–2 shift command for shifting the transmission from the first-speed position to the second-speed position should be generated from the electronic control unit 52.

(b) The throttle opening angle TA should be larger than a predetermined threshold $TA_2$.

(c) An amount of decrease in the throttle opening angle TA during the shifting of the transmission 14 should be smaller than a predetermined value $\Delta TA$.

(d) A time length CME1-2 after the generation of the 1–2 shift command from the control unit 52 should be shorter than a predetermined threshold $CME1-2_2$.

The threshold $TA_2$ of the above requirement (b) is selected to be about 10%, which prevents the engine 10 from stalling. The above requirement (c) is provided to prevent a decrease in the engine speed NE due to a decrease in the amount of slip of the torque converter 12 due to a movement of the accelerator pedal of the vehicle to its non-operated position, and the threshold $\Delta TA$ is selected to be about 2%. The threshold $CME1-2_2$ of the above requirement (d) is selected to be about two seconds, which permit the determination in step S4-12 to be effected while the transmission 14 is in the process of actual shifting according to the 1–2 shift command.

Step S4-10 is followed by step S4-11 to determine whether all of the above requirements (a) through (d) are satisfied. If a negative decision (NO) is obtained in step S4-11, one cycle of execution of the sub-routine of FIGS. 6 and 7 is terminated. If an affirmative decision (YES) is obtained in step S4-11, the control flow goes to step S4-12 to determine whether a normal-OFF condition of the valve S1 is satisfied, that is, whether an amount of decrease $\Delta NE$ of the detected engine speed NE during a 2-second period after the generation of the 1–2 shift command is larger than a predetermined threshold $\Delta NE_2$. Described more specifically, step S4-12 consists of a step of calculating a difference $\Delta NE$ between a highest engine speed NEMAX during the above-indicated 2-second period and a last engine speed NESMT at the end of this period, and a step of determining whether the calculated difference $\Delta NE$ is larger than the predetermined threshold $\Delta NE_2$. In this embodiment, step S4-12 corresponds to means for detecting a decrease in the engine speed NE in response to the 1–2 shift command.

The threshold $\Delta NE_2$ is determined to assure reliable determination on the basis of the calculated engine speed decrease amount $\Delta NE$, as to whether the transmission 14 has been actually shifted from the first-speed position to the third-speed position. For instance, the threshold $\Delta NE_2$ is about 150 r.p.m, which is slightly larger than a theoretical value that usually permits the above determination.

If a negative decision (NO) is obtained in step S4-12, this means that the plunger of the first solenoid-operated valve S1 cannot be moved from the OFF position to the ON position. In this case, one cycle of execution of the sub-routine of FIGS. 6 and 7 is terminated. If an affirmative decision (YES) is obtained in step S4-12, this means that the amount of decrease $\Delta NE$ of the engine speed NE is larger than the threshold $\Delta NE_2$, and therefore indicates that the transmission 14 has been normally shifted to the second-speed position according to the 1–2 shift command. Then, the control flow goes to step S4-13 to effect a processing similar to that in step S4-6 in the diagnosis of FIG. 6. The processing in step S4-13 is to permit the following step S4-14 to be implemented only once for one 1–2 shift command to shift the transmission 14 from the first-speed position to the second-speed position. Step S5-13 is followed by step S4-14 to determine whether a PRELIMINARY S1-OFF NORMAL flag XPS1OFJ is set at "1".

Upon generation of the first 1–2 shift command to shift the transmission 14 from the first-speed position to the second-speed position, a negative decision (NO) is obtained in step S4-14, and the control flow goes to step S4-15 to set the PRELIMINARY S1-OFF NORMAL flag XPS1OFJ to "1", and one cycle of execution of the sub-routine of FIGS. 6 and 7 is terminated. If an affirmative decision (YES) is again obtained in step S4-12 upon generation of the second 1–2 shift command, an affirmative decision (YES) is obtained in step S4-14 since the PRELIMINARY S1-OFF NORMAL flag XPS1OFJ was set to "1" in step S4-15 upon generation of the first 1–2 shift command. Then, step S4-16 is implemented to reset the S1-OFF DEFECT flag XDS1OF to "0", since the plunger of the valve S1 was able to be moved from the OFF position to the ON position, that is, the plunger is no longer abnormally kept in the OFF position. Step S4-16 is followed by step S4-17 to reset also the PRELIMINARY S1-OFF DEFECT flag XDS1OFJ to "0". Then, step S4-18 is implemented to set an S1-OFF NORMAL flag XPS1OF to "1", and one cycle of execution of the sub-routine of FIGS. 6 and 7 is terminated.

In the present embodiment, steps S4-12 through S4-15 correspond to non-defect determining means for determining that the plunger of the first solenoid-operated valve S1 can be normally moved from the OFF position to the ON position (namely, the valve S1 is normally functioning), if the amount of decrease $\Delta NE$ of the engine speed NE exceeds the threshold $\Delta NE_2$ in response to a shift command generated by the electronic control unit 52 to shift the transmission 14 from the first-speed position to the second-speed position.

It is noted that the 1–2 second shift command to shift the transmission 14 to the second-speed position is generally generated after the transmission 14 has been once shifted to the third-speed or fourth-speed position from the second-speed position (established according to the first 1–2 shift command), namely, after the valve S1 has been commanded to be moved to the OFF position to establish the third- or fourth-speed position. Therefore, if an affirmative decision (YES) is again obtained in step S4-12 upon generation of the second 1–2 shift command, this means that the plunger of the valve S1 has been once moved from the ON position to the OFF position and then moved to the ON position.

Figure 9:
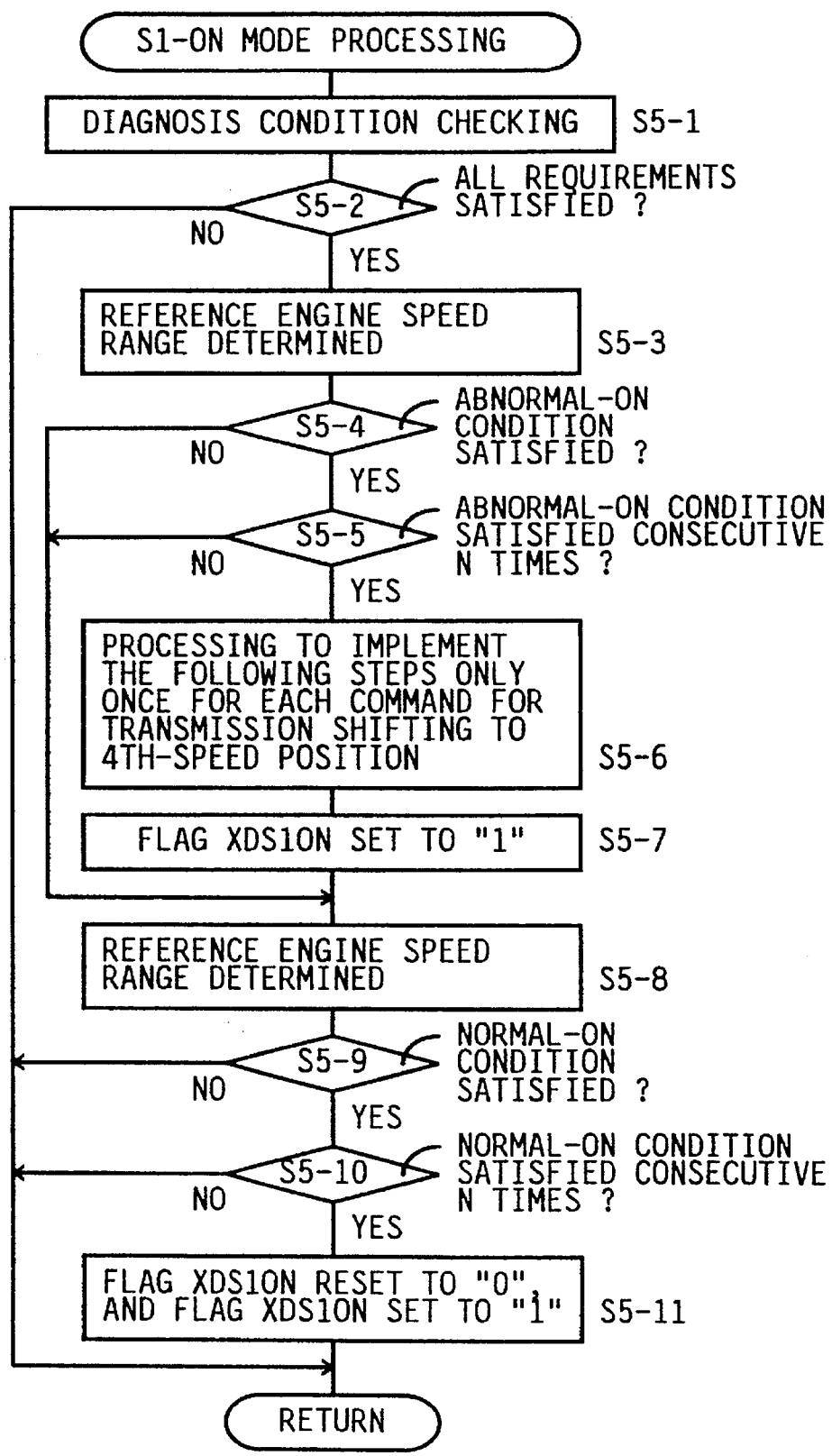
FIG. 9 is a flow chart illustrating a sub-routine executed in step S5 of the main routine of FIG. 5.

Referring back to the main routine of FIG. 5, step S4 is followed by step S5 to effect an S1-ON mode processing sub-routine illustrated in the flow chart of FIG. 9. This sub-routine is initiated with step S5-1 to check if the vehicle is in a predetermined condition that permits accurate determination on the basis of the engine speed NE, as to whether the plunger of the first solenoid-operated valve S1 is abnormally kept in its ON position (whether an S1-ON defect exists), and as to whether the plunger can be normally moved from the ON position to the OFF position, namely, whether the S1-ON defect has been removed. For example, the predetermined condition is satisfied if the following six requirements are all satisfied:

(a) The output shaft speed NO should be lower than a predetermined threshold $f_{31}(TA)$.

(b) The output shaft speed NO should be held within a range between a lower limit $NO_{31}$ and an upper limit $NO_{32}$.

(c) The throttle opening angle TA should be held within a range between a lower limit $TA_{31}$ and an upper limit $TA_{32}$.

(d) A shift command for shifting the transmission 14 to the fourth-speed position should be generated by the electronic control unit 52.

(e) The intake air quantity GN should be larger than a predetermined threshold $GN_3$.

(f) A time length CMES after the generation of the shift command should be longer than a predetermined threshold $CMES_3$.

The above six requirements should be satisfied to determine on the engine speed NE whether the S1-ON defect exists, that is, whether the transmission 14 is actually placed in the first-speed position even though the electronic control device 52 generates a shift command to shift the transmission to the fourth-speed position. See FIG. 3(B).

Figure 10A:
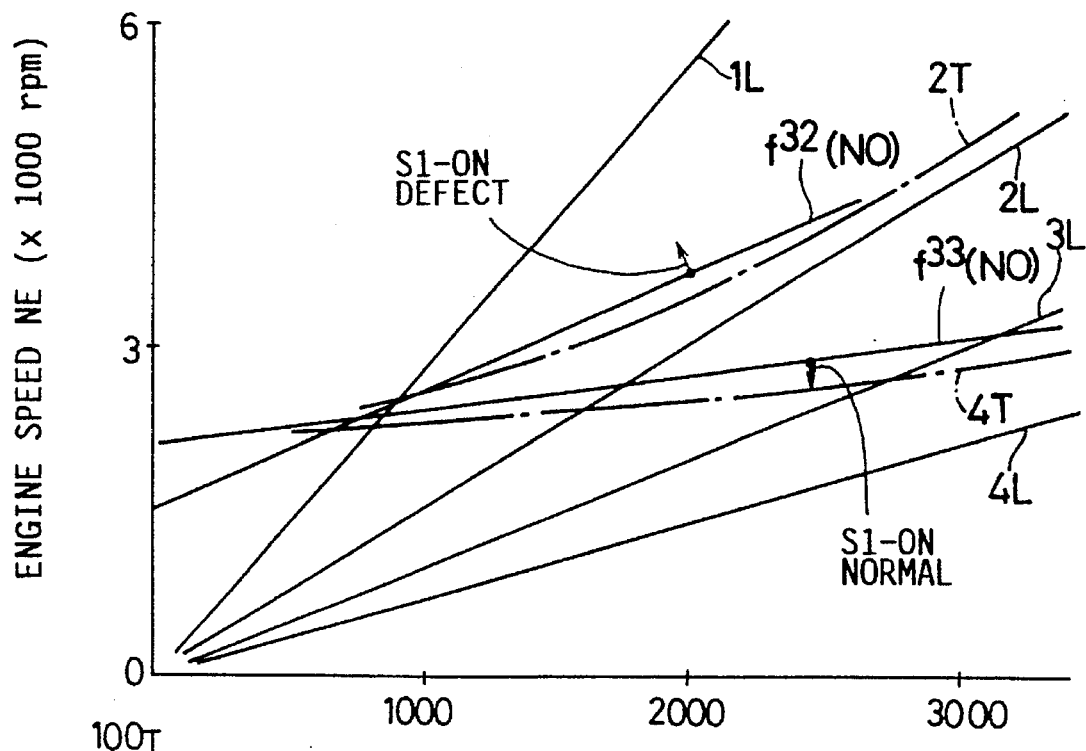
FIG. 10, comprising of FIGS. 10A and 10B, is a graph for explaining a detection area in the sub-routine of FIG. 9.
Figure 10B:
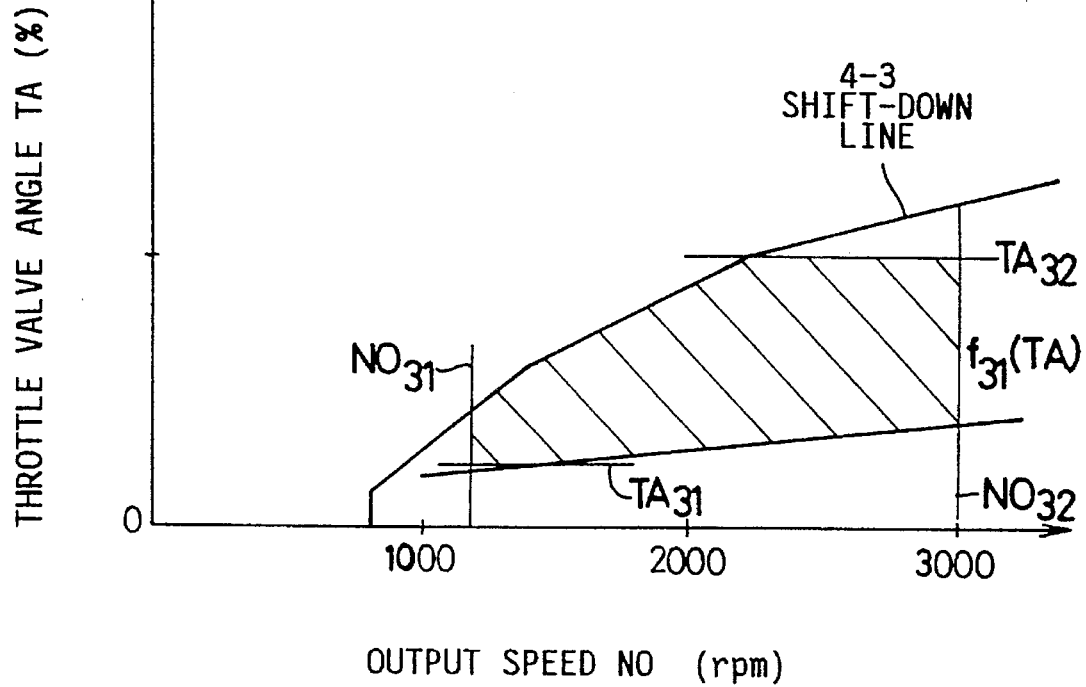

The threshold or lower limit $f_{31}(TA)$ of the output shaft speed NO of the above requirement (a) is determined as a function indicated in the lower graph of FIG. 10, so as to permit the engine speed NE to rise above a predetermined threshold $f^{32}(NO)$ as indicated in the upper graph of FIG. 10, in any operating condition as long as the other requirements are satisfied, if the transmission 14 is shifted to the first-speed position in response to the 3–4 shift command, for example. The lower limit $NO_{31}$ of the output shaft speed NO of the above requirement (b) is selected to be higher than the level represented by the 4T1L threshold line shown in FIG. 4, while the upper limit $NO_{32}$ is selected so as to permit determination in step S5-4 without an excessive rise of the engine speed NE. For example, the lower and upper limits $NO_{31}$ and $NO_{32}$ are selected at about 1200 r.p.m. and 3000 r.p.m., respectively. The lower and upper limits $TA_{31}$ and $TA_{32}$ of the throttle opening angle TA of the above requirement (c) are determined to prevent stalling of the engine 10 and assure stable high-speed running of the vehicle, respectively, and are selected at about 12% and 50%, respectively. The requirements (a), (b), (c) and (d) cooperate to define a TA-NO relationship area as indicated by hatching in the lower graph of FIG. 10. The above requirement (e) is provided to avoid the present diagnosis of FIG. 9 while the vehicle is running at a relatively high altitude, namely, to permit the diagnosis only when the intake air quantity GN is sufficient in relation to the output torque of the engine 10. For instance, the threshold $GN_3$ is selected at about 0.55 g/rev. when an air conditioner of the vehicle is in operation, and about 0.4 g/rev. when the air conditioner is not in operation. The requirement (f) is provided to prevent the diagnosis while the transmission 14 is in a transient state or in the process of a shifting action immediately after the generation of the shift command.

Step S5-1 is followed by step S5-2 to determine whether the above requirements (a) through (f) are all satisfied. If a negative decision (NO) is obtained in step S5-2, one cycle of execution of the sub-routine of FIG. 9 is terminated. If an affirmative decision (YES) is obtained in step S5-2, the control flow goes to step S5-3 to determine the threshold engine speed value $f^{32}(NO)$ described above with respect to the requirement (a). The threshold value $f^{32}(NO)$ is determined on the detected output shaft speed NO. This value $f^{32}(NO)$ is an upper limit of a predetermined reference range of the engine speed NE in which the engine speed NE is expected to fall if the transmission 14 is actually placed in the fourth-speed position in response to the shift command. Namely, the upper limit $F^{32}(NO)$ is determined to determine that the transmission 14 is placed in the first-speed position (4T) if the engine speed NE is higher than the upper limit (is outside the reference range). To this end, a threshold line defining the threshold engine speed value or upper limit $F^{32}(NO)$ is located between the NE-NO line for the position 1L and the NE-NO line for the position 4T, as indicated in FIG. 10. However, the threshold line of the upper limit $F^{32}(NO)$ is preferably as close as possible to the line for the position 1L, but should be spaced from this line (in the lower direction as seen in FIG. 10) by an amount which is sufficient to accommodate a variation in the engine speed NE due to fluctuating factors at the time of determination as to whether the detected engine speed NE is outside the predetermined reference range. In the present embodiment, the threshold line of the upper limit $f^{32}(NO)$ as indicated in FIG. 10 is determined by experiment. The upper limit $F^{32}(NO)$ defining the reference range of the engine speed NE is stored in the RAM.

Step S5-3 is followed by step S5-4 to determine whether an abnormal-ON condition of the valve S1 is satisfied, that is, whether the engine speed NE detected by the engine speed sensor 64 is higher than the upper limit $f^{32}(NO)$, namely, not held within the predetermined reference range. If the engine speed NE is higher than the upper limit $f^{32}(NO)$, this means that the transmission 14 is placed in the first-speed position although it is commanded to be shifted to the fourth-speed position. This indicates that the plunger of the valve S1 is abnormally kept in its ON position, namely, there exists the S1-ON defect.

If a negative decision (NO) is obtained in step S5-4, the control flow goes to step S5-8 and the following steps to effect a diagnosis to determine whether the plunger of the valve S1 can be moved from the ON position to the OFF position, that is, whether the S1-ON defect has been removed. If an affirmative decision (YES) is obtained in step S5-4, the control goes to step S5-5 to determine whether the abnormal-ON condition of the valve S1 has been satisfied consecutive N times, that is, whether the affirmative decision (YES) has been obtained in step S5-4 a predetermined number (N) of times consecutively, for instance five times. In other words, for example, an affirmative decision (YES) is obtained in step S5-5 if the affirmative decision (YES) is obtained in step S5-4 in each of the five consecutive cycles of execution of the sub-routine of FIGS. 9. If a negative decision (NO) is obtained in step S5-5, the control goes to step S5-8. If an affirmative decision (YES) is obtained in step S5-5, the control flow goes to step S5-6 to effect a processing that permits step S5-7 (and the following steps) to be implemented only once for each shift command to shift the transmission 14 to the fourth-speed position. Step S5-6 is followed by step S5-7 to set an S1-ON DEFECT flag XDS1ON to "1". In this embodiment, steps S5-4 and S5-7 correspond detecting means for determining the presence of a defect associated with the automatic transmission system, if the detected engine speed NE is outside the determined reference range, i.e., higher than the upper limit $f^{32}$(NO after a shifting operation of the transmission according to a shift command when the vehicle is placed in the predetermined condition Then, the control flow goes to step S5-8 to determine a reference range of the engine speed NE within which the engine speed NE is expected to fall if the transmission 14 is actually placed in the commanded fourth-speed position. The reference range is defined by an upper limit $f^{33}$(NO) as represented by a threshold line indicated in FIG. 10. This threshold line defining the threshold engine speed value or upper limit $f^{33}$(NO) is located between the NE-NO line for the position 1L and the NE-NO line for the position 4T, as indicated in FIG. 10. However, the threshold line of the upper limit $f^{33}$(NO) is preferably as close as possible to the line for the position 4T, but should be spaced from this line (in the upper direction as seen in FIG. 10) by an amount which is sufficient to accommodate a variation in the engine speed NE. In step S5-8, the upper limit $f_{33}$(NO) is determined on the basis of the detected output shaft speed NO. The upper limit $f^{33}$(NO) defining the reference range is stored in the RAM.

Step S5-8 is followed by step S5-9 to determine whether a normal-ON condition of the valve S1 is satisfied, that is, whether the detected engine speed NE is lower than the upper limit $f^{33}$(NO), that is, held within the reference range. If an affirmative decision (YES) is obtained in step S5-9, this means that the plunger of the first solenoid-operated valve S1 can be moved from the ON position to the OFF position, that is, the S1-ON defect has been removed. In this case, the control flow goes to step S5-10 to determine that the normal-ON condition has been satisfied a predetermined number of times consecutively, for example, five consecutive times. If a negative decision (NO) is obtained in step S5-10, one cycle of execution of the sub-routine of FIG. 9 is terminated. If an affirmative decision (YES) is obtained in step S5-10, the control flow goes to step S5-11 to reset the S1-ON DEFECT flag XDS1ON to "0" and set an S1-ON NORMAL flag XPS1ON to "1".

Figure 11:
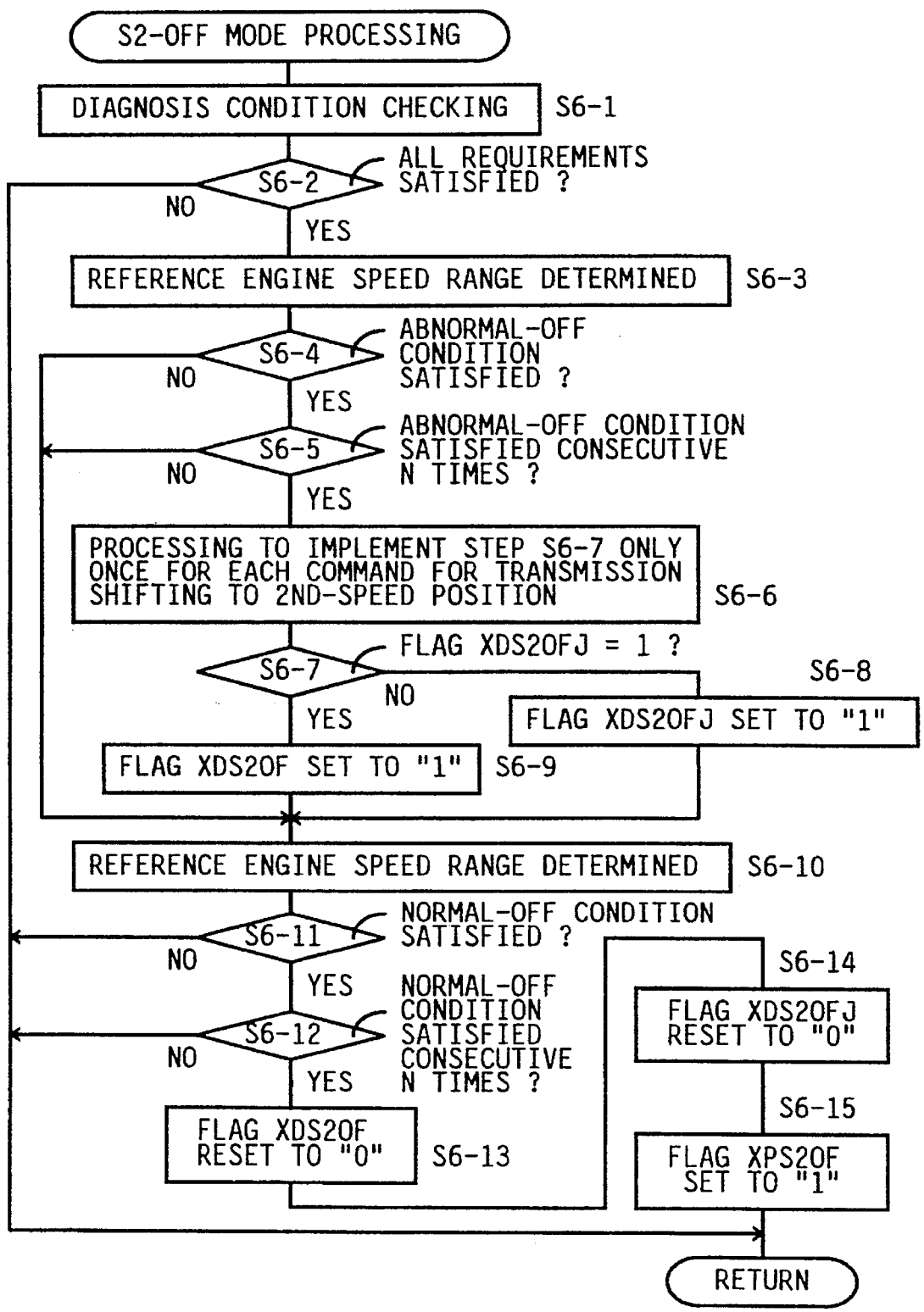
FIG. 11 is a flow chart illustrating a sub-routine executed in step S6 of the main routine of FIG. 5.

Referring back to the main routine of FIG. 5, step S5 is followed by step S6 to effect an S2-OFF mode processing sub-routine illustrated in the flow chart of FIG. 11. This sub-routine is initiated with step S6-1 to check if the vehicle is in a predetermined running condition which permits accurate determination on the basis of the engine speed NE, as to whether the plunger of the valve S2 is abnormally held in its OFF position (whether there exists an S2-OFF defect), and as to whether the plunger can be normally moved from the OFF position to the ON position (e.e., whether the S2-OFF defect has been removed). For example, the vehicle is considered to be in the predetermined running condition if the following five requirements are satisfied:

(a) The output shaft speed NO should be held within a range between predetermined threshold levels $f_4$(TA) and $NO_4$, and the throttle opening angle TA should be held within a range between predetermined threshold values $TA_{41}$ and $TA_{42}$.

(b) The intake air quantity GN of the engine 10 should be larger than a predetermined threshold value $GN_4$.

(c) A flag X4L4L should be set at "1".

(d) A shift command for shifting the transmission 14 to the second-speed position (2nd) should be generated by the electronic control unit 52.

(e) A time length CMEH after a start of a run of the vehicle should be shorter than a predetermined threshold CMES$_4$.

As indicated in FIG. 3(B), if the plunger of the valve S2 is abnormally kept in its OFF position due to sticking, for example, the transmission 14 is shifted to the first-speed position (1T) even if the transmission is commanded to be shifted to the second-speed position (2T). When the five requirements indicated above are all satisfied, that is, when the vehicle is placed in the predetermined running condition, it is possible to check if the transmission has been shifted to the first-speed position when it is commanded to be shifted to the second-speed position, namely, to determine whether the plunger of the valve S2 is abnormally kept in its OFF position for some reason (e.g., sticking) other than electrical disconnection of the solenoid coil.

The above requirement (a) is formulated to permit determination as to whether the transmission 14 is placed in the first-speed position 1L with the lock-up clutch 32 placed in the engaged position, or in the second-speed position 2T with the lock-up clutch 32 placed in the released position. For instance, the threshold $f_4$(TA) is selected higher by a suitable amount than the lower limit represented by the 2T1L threshold line, while the threshold $NO_4$ is selected within a range in which the engine speed NE is lower than its highest level when the transmission 14 is placed in the first-speed position. On the other hand, the threshold values $TA_{41}$ and $TA_{42}$ are determined to prevent stalling of the engine 10 and assure stable medium-speed running of the engine 10, respectively, and are selected to be about 12% and 50%, respectively. The requirement (a) defines a TA-NO relationship area as indicated by hatching in the lower graph of FIG. 12. The above requirement (b) is provided to avoid the present diagnosis of FIG. 11 while the vehicle is running at a relatively high altitude, namely, to permit the diagnosis only when the intake air quantity GN is sufficient in relation to the output torque of the engine 10. For instance, the threshold $GN_1$ is selected at about 0.55 g/rev. when an air conditioner of the vehicle is in operation, and about 0.4 g/rev. when the air conditioner is not in operation. The requirement (e) is provided to prevent the diagnosis while the transmission 14 is in a transient state or in the process of a shifting action immediately after the generation of the shift command to shift the transmission to the second-speed position.

Then, the control flow goes to step S6-2 to determine whether all of the five requirements (a) through (e) are satisfied. If a negative decision (NO) is obtained in step S6-2, one cycle of execution of the sub-routine of FIG. 11 is terminated. If an affirmative decision (YES) is obtained in step S6-2, the control flow goes to step S6-3 to determine, on the basis of the detected speed NO, a threshold engine speed value or upper limit $F^{41}$(NO) of a reference range of the engine speed NE within which the engine speed NE is expected to fall while the transmission 14 is placed in the second-speed position selected by the shift command generated from the electronic control unit 52. The threshold engine speed value $f^{41}$(NO) is determined to determine that the transmission 14 is placed in the second-speed position (2T) if the engine speed NE is lower than the upper limit (is held within the reference range), while the transmission 14 is placed in the first-speed position (1L) if the engine speed NE is higher than the lower upper limit (is not held within the reference range). To this end, a threshold line defining the threshold engine speed value or lower limit $f^{41}(NO)$ may be selected so as to be located between the NE-NO line for the position 1L and the NE-NO line for the position 2T. In the present embodiment, however, the threshold line for the position 1L is used as the threshold line representing the lower limit $f^{41}(NO)$, as shown in the upper graph of FIG. 12. The upper limit $F^{41}(NO)$ defining the reference range is stored in the RAM.

Step 6-3 is followed by step S6-4 to determine whether an abnormal-OFF condition of the valve S2 is satisfied, that is, whether the detected engine speed NE is higher than the upper limit $f^{41}(NO)$, namely, outside the predetermined reference range. If the engine speed NE is higher than the lower limit $f^1(NO)$, this means that the transmission 14 is placed in the first-speed position although it is commanded to be shifted to the second-speed position, that is, the plunger of the solenoid-operated valve S2 is abnormally held in its OFF position, while the valve S2 has been commanded to be operated to the ON position to place the transmission 14 in the second-speed position.

If a negative decision (NO) is obtained in step S6-4, the control flow goes to step S6-10 and the following steps to effect a diagnosis to determine whether the plunger of the valve S2 can be moved from the OFF position to the ON position, that is, whether the S2-OFF defect has been removed. If an affirmative decision (YES) is obtained in step S6-4, the control goes to step S6-5 to determine whether the abnormal-OFF condition of the valve S2 has been satisfied consecutive N times, that is, whether the affirmative decision (YES) has been obtained in step S6-4 a predetermined number (N) of times consecutively, for instance five times. If a negative decision (NO) is obtained in step S6-5, the control flow goes to step S6-10. If an affirmative decision (YES) is obtained in step S6-5, the control flow goes to step S6-6 to effect a processing to permit the following step S6-7 to be implemented only once during each shift command to shift the transmission 14 to the second-speed position. Then, step S6-7 is implemented to determine whether a PRELIMINARY S21-OFF DEFECT flag XDS2OFJ is set at "1". When step S6-7 is implemented for the first time, that is, upon generation of the first shift command to shift the transmission to the second-speed position, a negative decision (NO) is obtained in step S6-7, and the control flow goes to step S6-8 to set the flag XDS2OFJ to "1". Step S6-8 is followed by step S6-10 and the following steps.

If an affirmative decision (YES) is obtained in step S6-5 upon generation of the second shift command (e.g., 1–2 shift command or 3–2 shift command) to shift the transmission 14 to the second-speed position, an affirmative decision (YES) is obtained in step S6-7 since the PRELIMINARY S2-OFF DEFECT flag XDS2OFJ was set to "1" in step S6-8 upon generation of the first shift command. In this case, step S6-7 is followed by step S6-9 in which an S2-OFF DEFECT flag XDS2OF is set to "1". In the present embodiment, steps S6-4 and S6-9 correspond to defect detecting means for determining the presence of a defect (i.e., S2-OFF defect) associated with the automatic transmission 14, if the detected engine speed NE is not held within the predetermined reference range (the upper limit of which is the determined threshold value $f^{41}(NO)$), after a shifting operation of the transmission according to a shift command when the vehicle is placed in predetermined condition (when the affirmative decision is obtained in step S6-2). That is, a defect that the plunger of the second solenoid-operated valve S2 is abnormally kept in the OFF position is detected if the engine speed NE is higher than the threshold level or lower limit $f^{41}(NO)$.

Figure 12A:
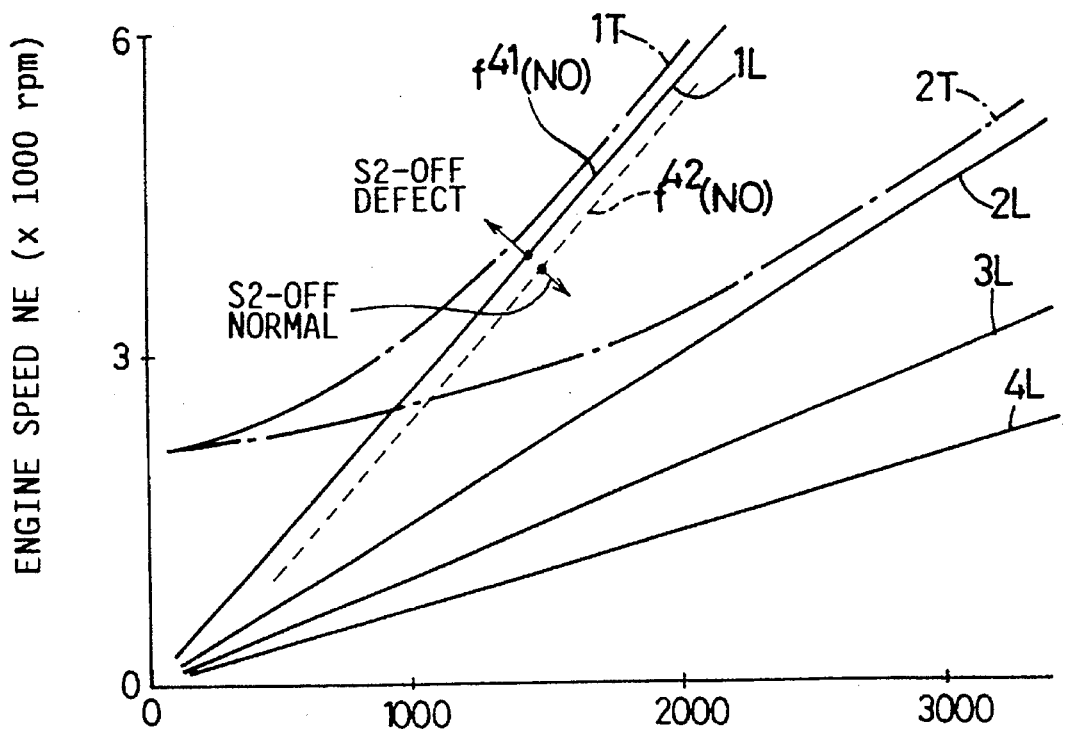
FIG. 12, comprising of FIGS. 12A and 12B, is a graph for explaining a detection area in the sub-routine of FIG. 11.
Figure 12B:
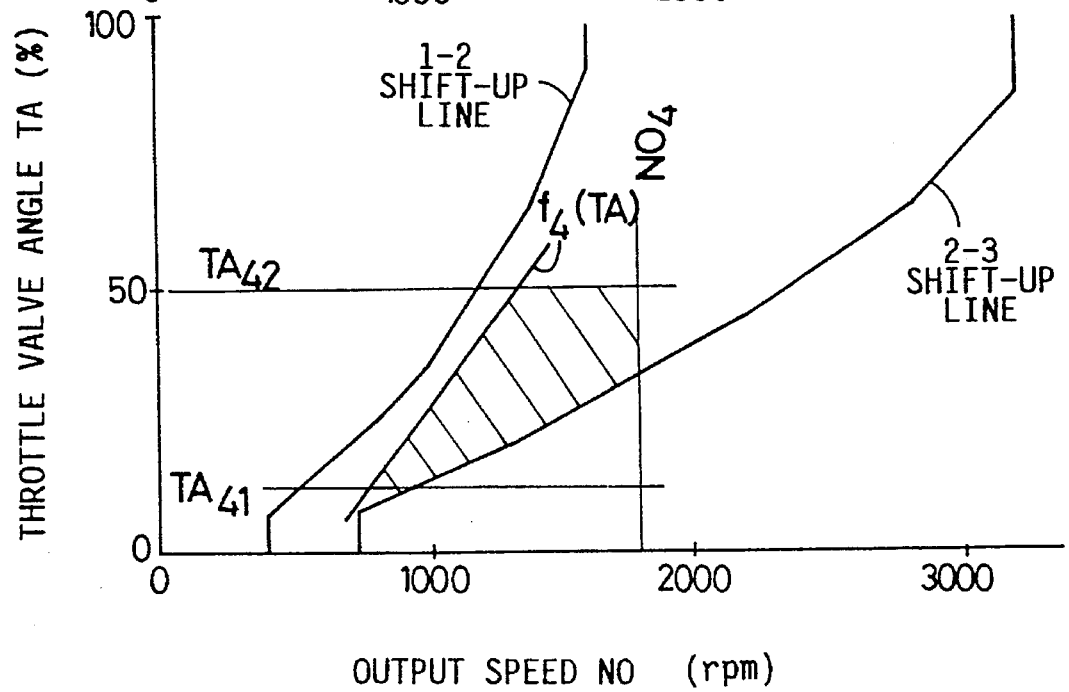

Then, the control flow goes to step S6-10 to determine, on the basis of the detected output shaft speed NO, a reference range of the engine speed NE within which the engine speed NE is expected to fall if the transmission is actually placed in the commanded second-speed position. The reference range is defined by an upper limit $f^{42}(NO)$ as represented by a threshold line indicated in FIG. 12. This threshold line defining the threshold engine speed value or upper limit $f^{42}(NO)$ may be selected so as to be located between the NE-NO line for the position 1L and the NE-NO line for the position 2T, as indicated in FIG. 12. In the present embodiment, however, the threshold line of the upper limit $f^{42}(NO)$ is located relatively close and parallel to the threshold line for the position 1T, so that the upper limit $f^{42}(NO)$ is higher by a suitable amount than the level represented by the threshold line for the position 1T, so that the thus determined upper limit $f^{42}(NO)$ permits a diagnosis in the following step S6-11 as to whether the plunger of the valve S2 can be moved from the OFF position to the ON position, as distinguished from the upper limit $f^{42}(NO)$ used in step S6-4 to effect the diagnosis as to whether the plunger of the valve S2 is kept in the OFF position. The upper limit $f^{42}(NO)$ shown in FIG. 12 is determined by experiment. The upper limit $f^{42}(NO)$ defining the reference range is stored in the RAM.

Step S6-10 is followed by step S6-11 to determine whether a normal-OFF condition of the valve S2 is satisfied, that is, whether the detected engine speed NE is lower than the upper limit $f^{42}(NO)$, that is, held within the reference range determined in step S6-10. If a negative decision (NO) is obtained in step S11, one cycle of execution of the sub-routine of FIG. 11 is terminated. If an affirmative decision (YES) is obtained in step S6-11, this means that the plunger of the first solenoid-operated valve S2 can be moved from the OFF position to the ON position, that is, the S2-OFF defect has been removed. In this case, the control flow goes to step S6-12 to determine that the normal-OFF condition has been satisfied a predetermined number of times consecutively, for example, five times. If a negative decision (NO) is obtained in step S6-12, one cycle of execution of the sub-routine of FIG. 11 is terminated. IF an affirmative decision (YES) is obtained in step S6-12, the control flow goes to step S6-13 to reset the S2-OFF DEFECT flag XDS2OF to "0", step S6-14 to reset the PRELIMINARY S2-OFF DEFECT flag XDS2OFJ to "0", and then to step S6-15 to set an S2-OFF NORMAL flag XPS2OF to "1". In the present embodiment, steps S6-11 and S6-13 correspond means for determining that the plunger of the valve S2 can be normally moved from the OFF position to the ON position.

Figure 13:
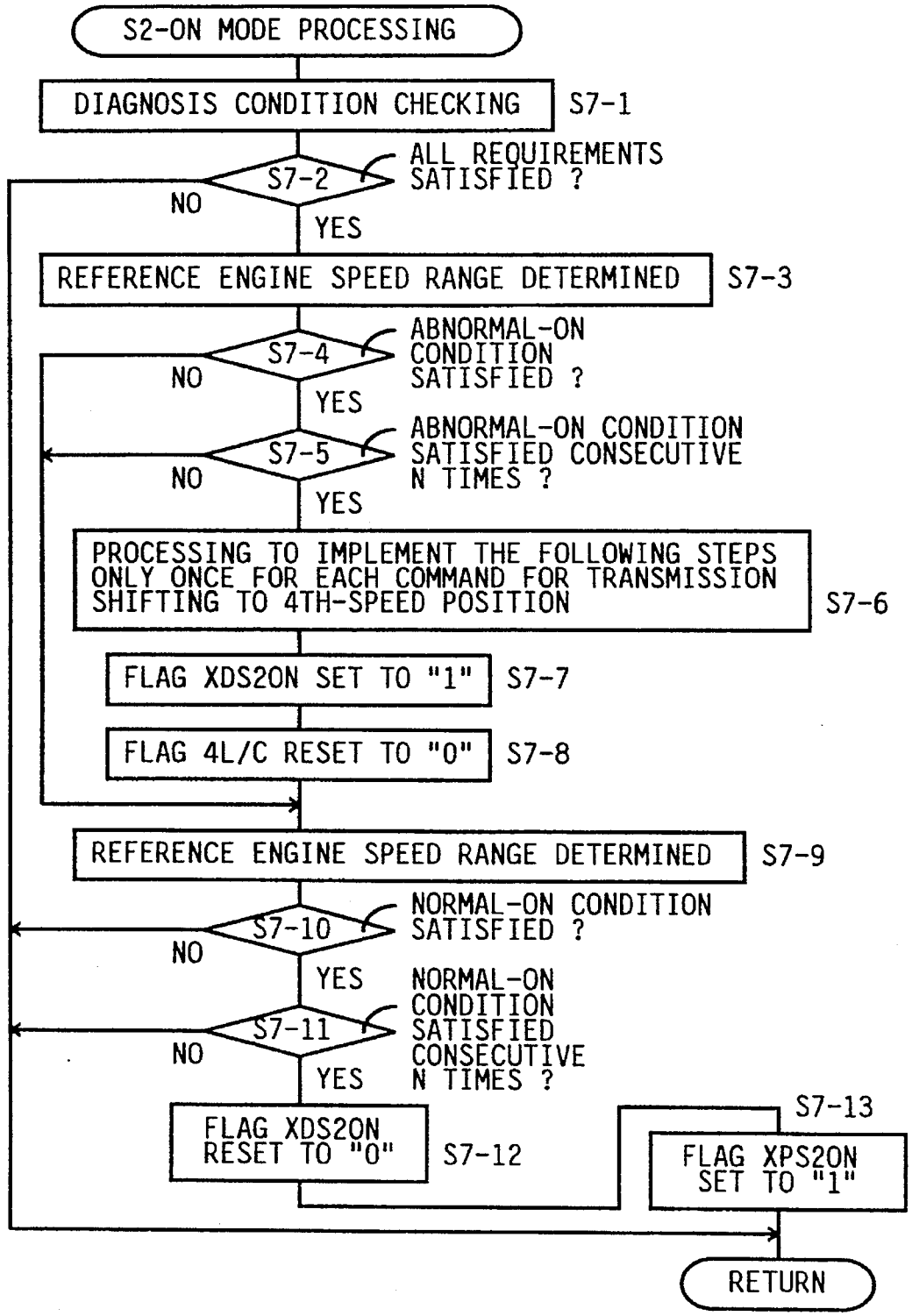
FIG. 13 is a flow chart illustrating a sub-routine executed in step S7 of the main routine of FIG. 5.

Referring back again to the main routine of FIG. 5, step S6 is followed by step S7 to effect an S2-ON mode processing sub-routine illustrated in the flow chart of FIG. 13. This sub-routine is initiated with step S7-1 to check if the vehicle is in a predetermined condition that permits accurate determination on the basis of the engine speed NE, as to whether the plunger of the second solenoid-operated valve S2 is abnormally kept in its ON position (whether an S2-ON defect exists), and as to whether the plunger can be normally moved from the ON position to the OFF position, namely, whether the S2-ON defect has been removed. For example, the predetermined condition is satisfied if the following six requirements are all satisfied:

(a) The output shaft speed NO should be held within a range between predetermined lower and upper limits $f^{51}(TA)$ and $f_{52}(TA)$, and should be lower than a predetermined upper limit $NO_5$.

(b) The intake air quantity GN of the engine 10 should be larger than a predetermined threshold value $GN_3$.

(c) A shift command for shifting the transmission 14 to the fourth-speed position should be generated by the electronic control unit 52.

(d) A flag YSL indicating that the lock-up clutch 32 is placed in the engaged position should be set at "1".

(e) A time length CMEL after generation of a lock-up command to bring the lock-up clutch 32 to the engaged position should be longer than a predetermined threshold $CMEL_5$.

(f) A time length CMES after the generation of the shift command should be longer than a predetermined threshold $CMES_5$.

The above six requirements should be satisfied to determine on the engine speed NE whether the S2-ON defect exists, that is, whether the transmission 14 is actually placed in the third-speed position even though the electronic control device 52 generates a shift command to shift the transmission to the fourth-speed position. See FIG. 3(B).

The requirement (a) is provided to permit determination on the basis of the engine speed NE as to whether the transmission 14 is placed in the fourth-speed or third-speed position. A threshold line representing the lower limit $f_{51}(TA)$ of the output shaft speed NO of the above requirement (a) is selected to be located a suitable distance above the 4L4T threshold line, while a threshold line representing the upper limit $F^{52}(NO)$ is selected to be located a suitable distance below the 4T3L threshold line. The upper limit $F^{52}(NO)$ is slightly higher than that of the 4T3L threshold line at the same throttle opening angle TA. The threshold $NO_5$ is determined to assure stable high-speed running of the vehicle. The requirement (a) defines a TA-NO relationship area indicated by hatching in the lower graph of FIG. 14. The requirement (b) is provided to avoid the present diagnosis of FIG. 13 while the vehicle is running at a relatively high altitude, namely, to permit the diagnosis only when the intake air quantity GN is sufficient in relation to the output torque of the engine 10. For instance, the threshold $GN_3$ is selected at about 0.8 g/rev. when an air conditioner of the vehicle is in operation, and about 0.6 g/rev. when the air conditioner is not in operation. The requirements (e) and (f) are provided to prevent the diagnosis while the transmission 14 is in a transient state or in the process of a shifting action immediately after the generation of the shift command.

Figure 14:
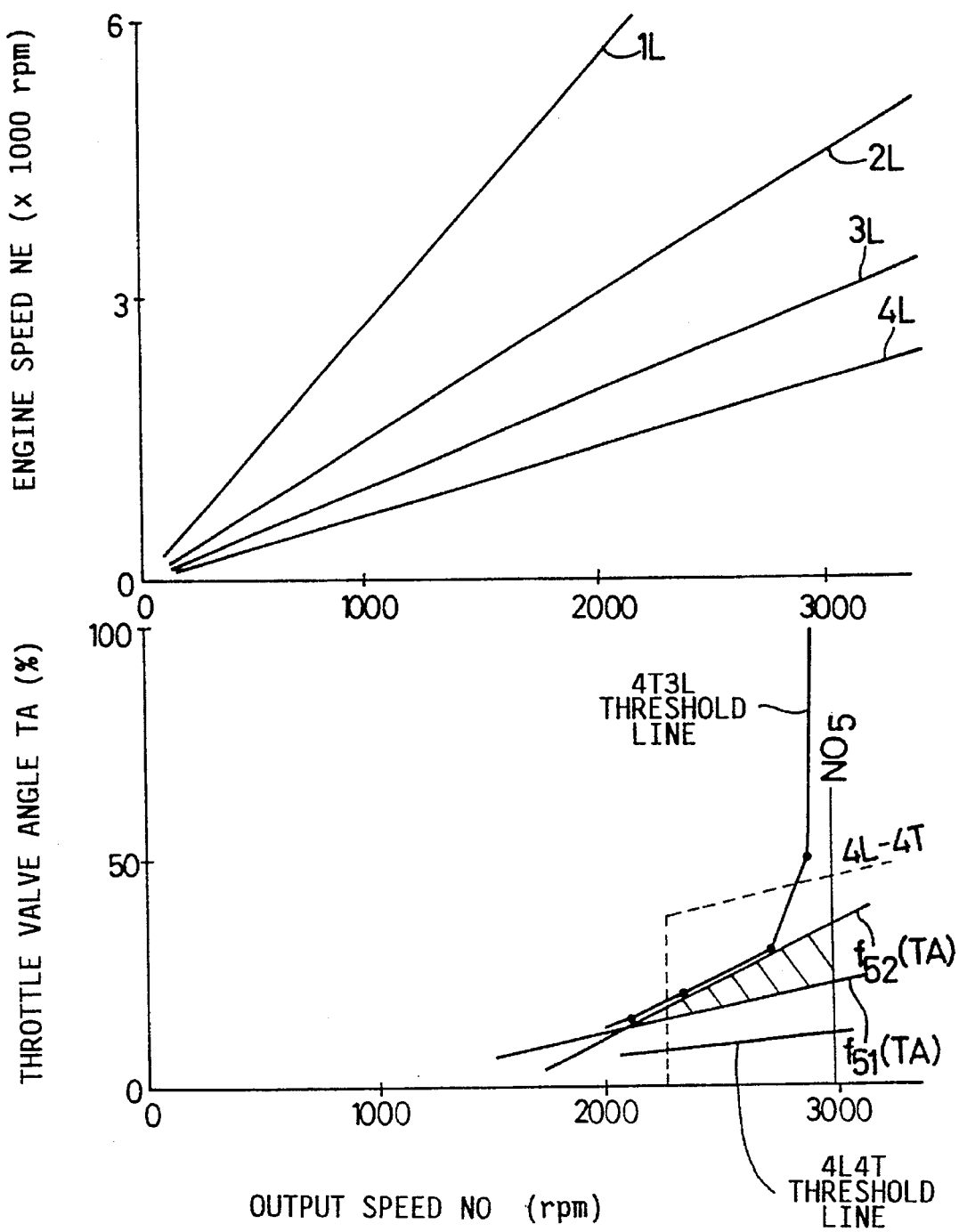
FIG. 14, comprising of FIGS. 14A and 14B, is a graph for explaining a detection area in the sub-routine of FIG. 13.
Figure 15:
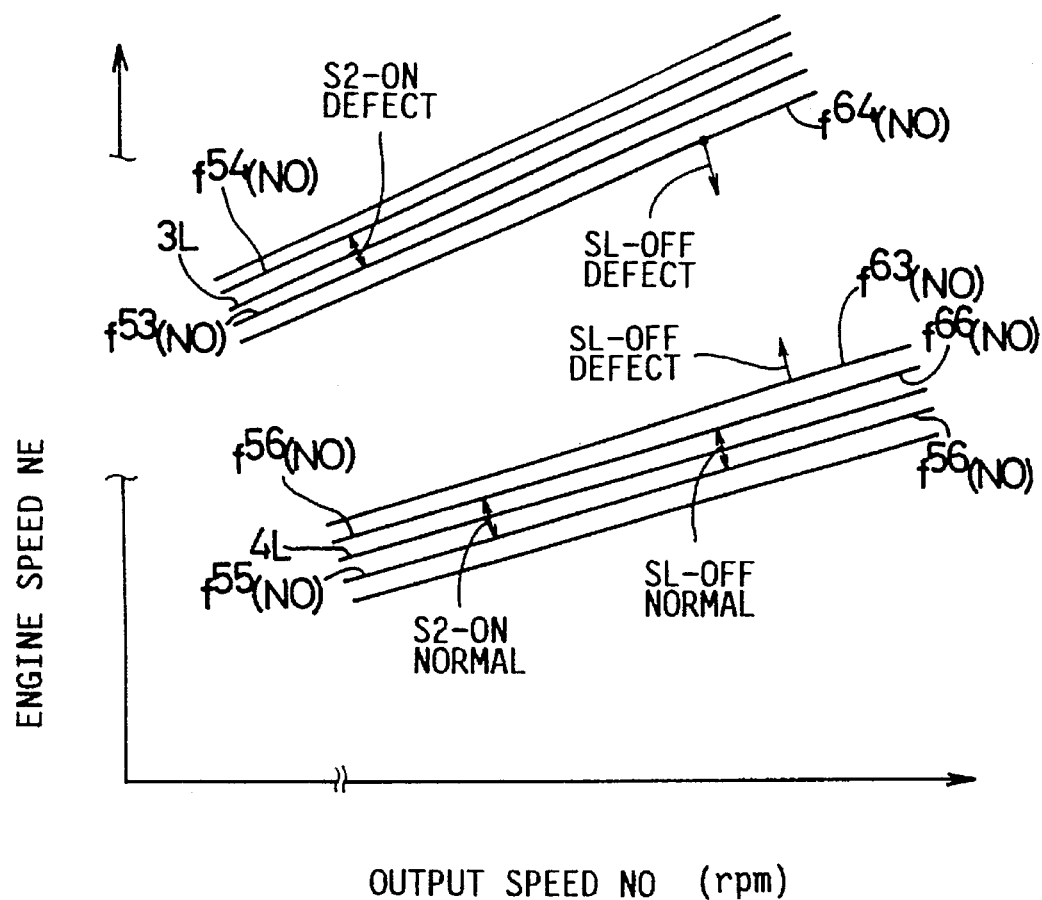
FIG. 15 is a graph for explaining a reference value used in the sub-routine of FIG. 13.

Step S7-1 is followed by step S7-2 to determine whether the above requirements (a) through (f) are all satisfied. If a negative decision (NO) is obtained in step S7-2, one cycle of execution of the sub-routine of FIG. 13 is terminated. If an affirmative decision (YES) is obtained in step S7-2, the control flow goes to step S7-3 to determine threshold levels $F^{53}(NO)$ and $f_{54}(NO)$ of the engine speed NE, on the basis of the detected output shaft speed NO. These threshold level $f_{53}(NO)$ and $f_{54}(NO)$ are indicated in the graph of FIG. 15 in which the lines 3L and 4L indicated in the upper graph of FIG. 14 are shown in enlargement. The threshold levels $f_{53}(NO)$ and $f_{54}(NO)$ are lower and higher by suitable amounts (e.g., 50 r.p.m.) than the level represented by the line for the third-speed position 3L, respectively. The amounts indicated above can be determined by experiment. If the engine speed NE is outside a range between the threshold levels $F^{53}(NO)$ and $f_{54}(NO)$, the transmission 14 is considered to be placed in the fourth-speed position 4L. The determined threshold levels $f^{53}(NO)$ and $f^{54}(NO)$ are stored in the RAM.

Step S7-3 is followed by step S7-4 to determine whether an abnormal-ON condition of the valve S1 is satisfied, that is, whether the engine speed NE detected by the engine speed sensor 64 is higher than the threshold level $F^{52}(NO)$ and lower than the threshold level $f_{54}(NO)$. If the engine speed NE is held within the range between these threshold levels, this means that the transmission 14 is placed in the third-speed position although it is commanded to be shifted to the fourth-speed position. This indicates that the plunger of the valve S2 is abnormally kept in its ON position, namely, there exists the S2-ON defect.

If a negative decision (NO) is obtained in step S7-4, the control flow goes to step S7-9 and the following steps to effect a diagnosis to determine whether the plunger of the valve S2 can be moved from the ON position to the OFF position, that is, whether the S2-ON defect has been removed. If an affirmative decision (YES) is obtained in step S7-4, the control goes to step S7-5 to determine whether the abnormal-ON condition of the valve S2 has been satisfied consecutive N times, that is, whether the affirmative decision (YES) has been obtained in step S7-4 a predetermined number (N) of times consecutively, for instance five times. If a negative decision (NO) is obtained in step S7-5, the control goes to step S7-9. If an affirmative decision (YES) is obtained in step S7-5, the control flow goes to step S7-6 to effect a processing that permits step S7-7 (and the following steps) to be implemented only once for each shift command to shift the transmission 14 to the fourth-speed position. Step S7-6 is followed by step S7-7 to set an S2-ON DEFECT flag XDS2ON to "1". Step S7-7 is followed by step S7-8 in which a flag X4L4L for indicating that the transmission is normally placed in the fourth-speed position with the lock-up clutch 32 placed in the engaged position is reset to "0".

Then, the control flow goes to step S7-9 to determine, on the basis of the detected output shaft speed No, lower and upper limits $f^{55}(NO)$ and $f^{56}(NO)$ which define a reference range of the engine speed NE within which the engine speed NE is expected to fall if the transmission 14 is actually placed in the commanded fourth-speed position. The lower limit $f^{55}(NO)$ is determined as represented by a threshold line indicated in FIG. 15, which is lower by a suitable amount (e.g., 50 r.p.m.) than the level represented by the line for the position 4T. The upper limit $f^{56}(NO)$ is higher by a suitable amount (e.g., 50 r.p.m.) than the level represented by the line for the position 4T. The lower and upper limits $f_{55}(NO)$ and $f^{56}(NO)$ defining the reference range are stored in the RAM.

Step S7-9 is followed by step S7-10 to determine whether a normal-ON condition of the valve S2 is satisfied, that is, whether the detected engine speed NE is higher than the lower limit $f^{55}(NO)$ and lower than the upper limit $f^{56}(NO)$, that is, held within the reference range. If an affirmative decision (YES) is obtained in step S7-10, this means that the plunger of the second solenoid-operated valve S2 can be moved from the ON position to the OFF position, that is, the S2-ON defect has been removed. In this case, the control flow goes to step S7-11 to determine that the normal-ON condition has been satisfied a predetermined number of times consecutively, for example, five consecutive times. If a negative decision (NO) is obtained in step S7-11, one cycle of execution of the sub-routine of FIG. 13 is terminated. If an affirmative decision (YES) is obtained in step S7-11, the control flow goes to step S7-12 to reset the S2-ON DEFECT flag XDS2ON to "0" and to step S7-13 to set an S2-ON NORMAL flag XPS2ON to "1".

In the present embodiment, steps S7-4 and S7-7 correspond to means for determining whether the plunger of the valve S2 is abnormally kept in the ON position, while steps S7-10 and S7-12 correspond to means for determining that the plunger of the valve S2 can be normally moved from the ON position to the OFF position.

Figure 16:
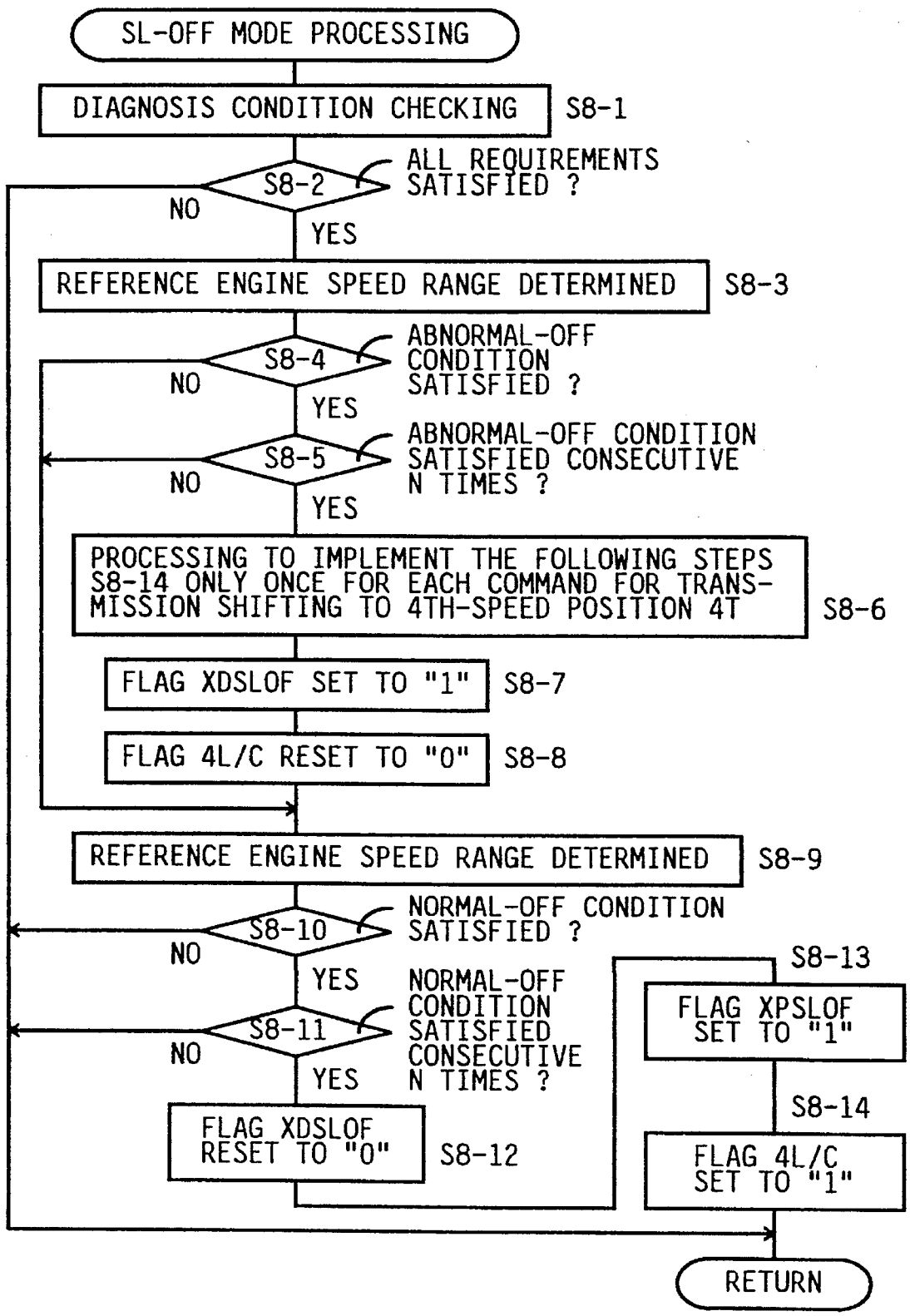
FIG. 16 is a flow chart illustrating a sub-routine executed in step S8 of the main routine of FIG. 5.

Referring back again to the main routine of FIG. 5, step S7 is followed by step S8 to effect an SL-OFF mode processing sub-routine illustrated in the flow chart of FIG. 16. This sub-routine is initiated with step S8-1 to check if the vehicle is in a predetermined running condition which permits accurate determination on the basis of the engine speed NE, as to whether the plunger of the third solenoid-operated valve SL is abnormally held in its OFF position (whether there exists an SL-OFF defect), and as to whether the plunger can be normally moved from the OFF position to the ON position (e.e., whether the SL-OFF defect has been removed). For example, the vehicle is considered to be in the predetermined running condition if the following six requirements are satisfied:

(a) The output shaft speed NO should be held within a range between predetermined threshold levels $f_{61}(TA)$ and $F_{62}(TA)$, and should be lower than a predetermined threshold $NO_{61}$. (b) The intake air quantity GN of the engine 10 should be larger than a predetermined threshold value $GN_6$.

(c) A shift command for shifting the transmission 14 to the fourth-speed position should be generated by the electronic control unit 52.

(d) The flag YSL indicating that the lock-up clutch 32 is placed in the engaged position should be set at "1".

(e) The time length CMEL after the lock-up clutch 32 is commanded to be brought to the engaged position should be longer than a predetermined threshold $CMEL_6$.

(f) The time length CMES after the generation of the shift command should be longer than a predetermined threshold $CMES_6$.

As indicated in FIG. 3(B), if the plunger of the valve SL is abnormally kept in its OFF position due to sticking, for example, the lock-up clutch 32 is in the released position with the transmission 14 shifted to the fourth-speed position 4T even if the lock-up clutch 32 is commanded to be placed in the engaged position with the transmission 14 shifted to the fourth-speed position 4L. When the above six requirements indicated above are all satisfied, that is, when the vehicle is placed in the predetermined running condition, it is possible to check if the lock-up clutch 32 remains in the released position when the lock-up command is generated, namely, to check if the plunger of the valve SL is abnormally kept in its OFF position.

The above requirement (a) is formulated to assure a sufficient amount of difference between the speeds of the torque converter 12 when the lock-up clutch 32 is placed in the encaged and released positions with the transmission 14 shifted to the fourth-speed position (4L, 4T). The above threshold values $f_{61}(TA)$ and $F^{62}(TA)$ are selected to be about (95×TA+900) and (40×TA=1600), respectively. For instance, the value $F^{62}(TA)$ is in the neighborhood of 3000 r.p.m. The above requirement (b) is provided to avoid the present diagnosis of FIG. 16 while the vehicle is running at a relatively high altitude, namely, to permit the diagnosis only when the intake air quantity GN is sufficient in relation to the output torque of the engine 10. For instance, the threshold $GN_1$ is selected at about 0.8 g/rev. when an air conditioner of the vehicle is in operation, and about 0.6 g/rev. when the air conditioner is not in operation. The requirements (e) and (f) are provided to effect the diagnosis while the transmission 14 is in a steady state. For example, the threshold values $CMEL_6$ and $CMES_6$ are selected to be about two seconds and three seconds, respectively.

Then, the control flow goes to step S8-2 to determine whether all of the six requirements (a) through (f) are satisfied. If a negative decision (NO) is obtained in step S8-2, one cycle of execution of the sub-routine of FIG. 16 is terminated. If an affirmative decision (YES) is obtained in step S8-2, the control flow goes to step S8-3 to determine threshold levels $f^{63}(NO)$ and $f^{64}(NO)$ of the engine speed NE, on the basis of the detected output shaft speed NO. These threshold level $f^{63}(NO)$ and $f^{64}(NO)$ are indicated in the graph of FIG. 15. The threshold level $f_{63}(NO)$ is higher by a suitable amount (e.g., 100 r.p.m.) than the level represented by the line for the fourth-speed position 4L, while the threshold level $f^{64}(NO)$ is lower by a suitable amount (e.g., 100 r.p.m.) than the level represented by the line for the third-speed position 3L. The amounts indicated above can be determined by experiment. If the engine speed NE is outside a range between the threshold levels $f^{63}(NO)$ and $f_{64}(NO)$, the lock-up clutch 32 is placed in the engaged position when the transmission 14 is placed in the fourth-speed position 4L. The determined threshold levels $f^{63}(NO)$ and $f^{64}(NO)$ are stored in the RAM.

Step S8-3 is followed by step S8-4 to determine whether an abnormal-OFF condition of the valve SL is satisfied, that is, whether the engine speed NE detected by the engine speed sensor 64 is higher than the threshold level $f^{63}(NO)$ and lower than the threshold level $f^{64}(NO)$. If the engine speed NE is held within the range between these threshold levels, this means that the lock-up clutch 32 is placed in the released position although it is commanded to be engaged with the transmission 14 placed in the fourth-speed position, that is, the plunger of the valve SL is abnormally kept in its OFF position, which indicates that there exists the SL-OFF defect.

If a negative decision (NO) is obtained in step S8-4, the control flow goes to step S8-9 and the following steps to effect a diagnosis to determine whether the plunger of the valve SL can be moved from the OFF position to the ON position, that is, whether the SL-OFF defect has been removed. If an affirmative decision (YES) is obtained in step S8-4, the control goes to step S8-5 to determine whether the abnormal-OFF condition of the valve SL has been satisfied consecutive N times, that is, whether the affirmative decision (YES) has been obtained in step S8-4 a predetermined number (N) of times consecutively, for instance five times. If a negative decision (NO) is obtained in step S8-5, the control goes to step S8-9. If an affirmative decision (YES) is obtained in step S8-5, the control flow goes to step S8-6 to effect a processing that permits the following steps to be implemented only once for each shift command to shift the transmission 14 to the fourth-speed position 4L with the lock-up clutch 32 placed in the engaged position. Step S8-6 is followed by step S8-7 to set an SL-OFF DEFECT flag XDSLOF to "1". Step S8-7 is followed by step S8-8 in which the flag X4L4L for indicating that the transmission is normally placed in the fourth-speed position 4L with the lock-up clutch 32 placed in the engaged position is reset to "0".

Then, the control flow goes to step S8-9 to determine, on the basis of the detected output shaft speed No, lower and upper limits $f^{65}(NO)$ and $f^{66}(NO)$ which define a reference range of the engine speed NE within which the engine speed NE is expected to fall if the transmission 14 is actually placed in the commanded fourth-speed position 4L. As indicated in FIG. 15, the lower limit $f^{65}(NO)$ is determined to be lower by a suitable amount (e.g., 50 r.p.m.) than the level represented by the line for the position 4L, while the upper limit $f^{66}(NO)$ is determined to be higher by a suitable amount (e.g., 50 r.p.m.) than the level represented by the line for the position 4L. The lower and upper limits $f^{65}s(NO)$ and $f^{66}(NO)$ defining the reference range are stored in the RAM.

Step S8-9 is followed by step S8-10 to determine whether a normal-OFF condition of the valve SL is satisfied, that is, whether the detected engine speed NE is higher than the lower limit $f^{65}(NO)$ and lower than the upper limit $f^{66}(NO)$, that is, held within the reference range. If an affirmative decision (YES) is obtained in step S8-10, this means that the plunger of the third solenoid-operated valve SL can be moved from the OFF position to the ON position, that is, the SL-OFF defect has been removed. In this case, the control flow goes to step S8-11 to determine that the normal-OFF condition has been satisfied a predetermined number of times consecutively, for example, five consecutive times. If a negative decision (NO) is obtained in step S8-11, one cycle of execution of the sub-routine of FIG. 16 is terminated. If an affirmative decision (YES) is obtained in step S8-11, the control flow goes to step S8-12 to reset the SL-OFF DEFECT flag XDSLOF to "0", step S8-13 to set an SL-OFF NORMAL flag XPSLOF to "1", and step S8-14 to set a LOCK-UP NORMAL flag XJ4T4T to "1".

In the present embodiment, steps S8-4 and S8-7 correspond means for determining whether the plunger of the valve SL is abnormally kept in the OFF position, while steps S8-10 and S8-12 correspond to means for determining that the plunger of the valve SL can be normally moved from the OFF position to the ON position.

Figure 17:
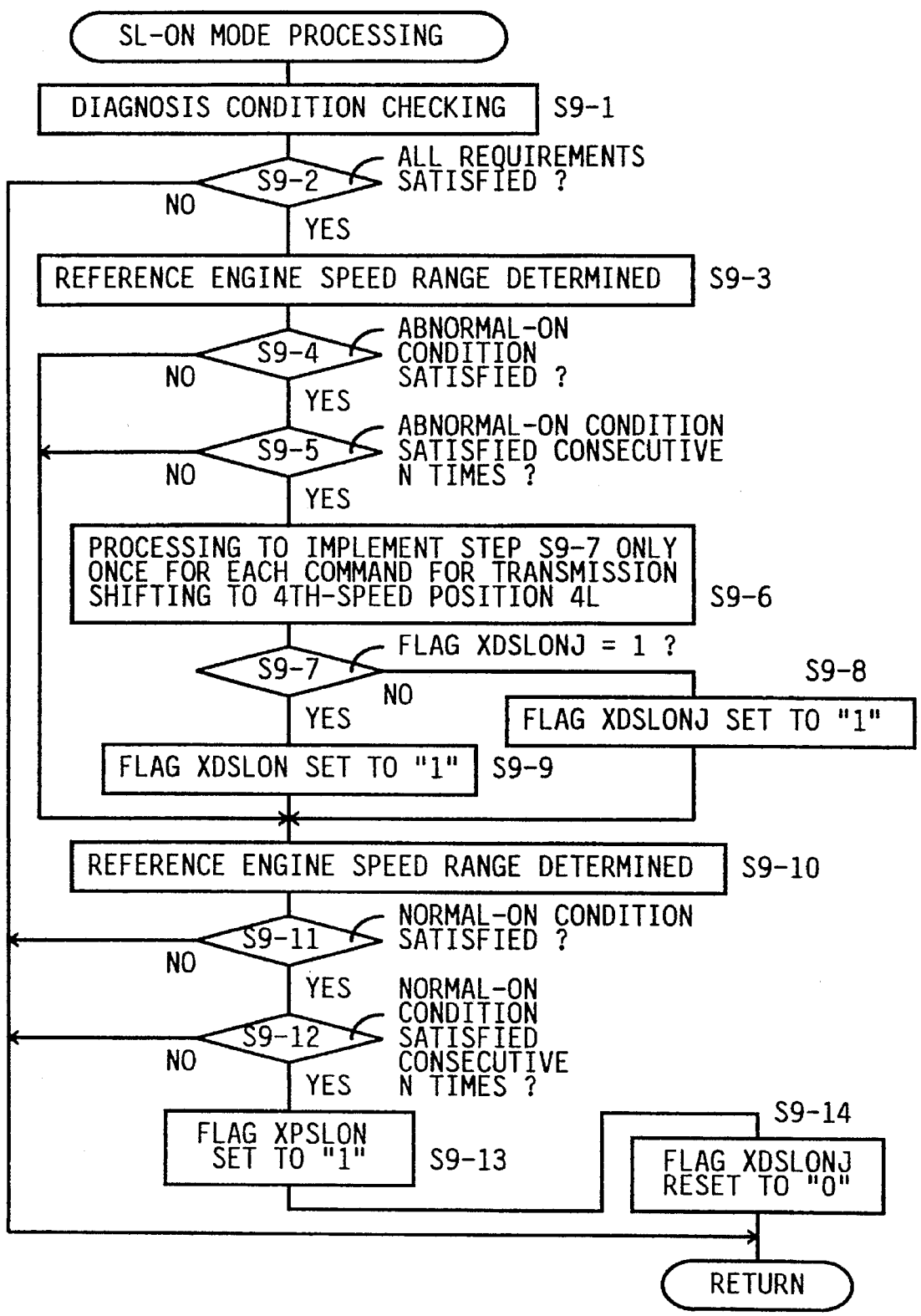
FIG. 17 is a flow chart illustrating a sub-routine executed in step S9 of the main routine of FIG. 5.

Referring back again to the main routine of FIG. 5, step S8 is followed by step S9 to effect an SL-ON mode processing sub-routine illustrated in the flow chart of FIG. 17. This sub-routine is initiated with step S9-1 to check if the vehicle is in a predetermined running condition which permits accurate determination on the basis of the engine speed NE, as to whether the plunger of the third solenoid-operated valve SL is abnormally held in its ON position (whether there exists an SL-ON defect), and as to whether the plunger can be normally moved from the ON position to the OFF position (e.e., whether the SL-ON defect has been removed). For example, the vehicle is considered to be in the predetermined running condition if the following five requirements are satisfied:

(a) The output shaft speed NO should be held within a range between predetermined threshold levels $NO_{71}$ and $NO_{72}$, and should be lower than a predetermined threshold $f^{71}(TA)$, while the throttle opening angle TA should be larger than a predetermined threshold $TA_{71}$.

(b) The intake air quantity GN of the engine 10 should be larger than a predetermined threshold value $GN_7$.

(c) A shift command for shifting the transmission 14 to the fourth-speed position should be generated by the electronic control unit 52.

(d) The flag YSL indicating that the lock-up clutch 32 is placed in the engaged position should be set at "0".

(e) The time length CMES after the generation of the shift command should be longer than a predetermined threshold $CMES_7$.

As indicated in FIG. 3(B), if the plunger of the valve SL is abnormally kept in its ON position due to sticking, for example, the lock-up clutch 32 is in the engaged position with the transmission 14 shifted to the fourth-speed position 4L even if the lock-up clutch 32 is commanded to be placed in the released position with the transmission 14 shifted to the fourth-speed position 4T. When the above five requirements indicated above are all satisfied, that is, when the vehicle is placed in the predetermined running condition, it is possible to check if the lock-up clutch 32 remains in the engaged position when it is commanded to be brought to the released position, namely, to check if the plunger of the valve SL is abnormally kept in its ON position.

Figures 18A, 18B:
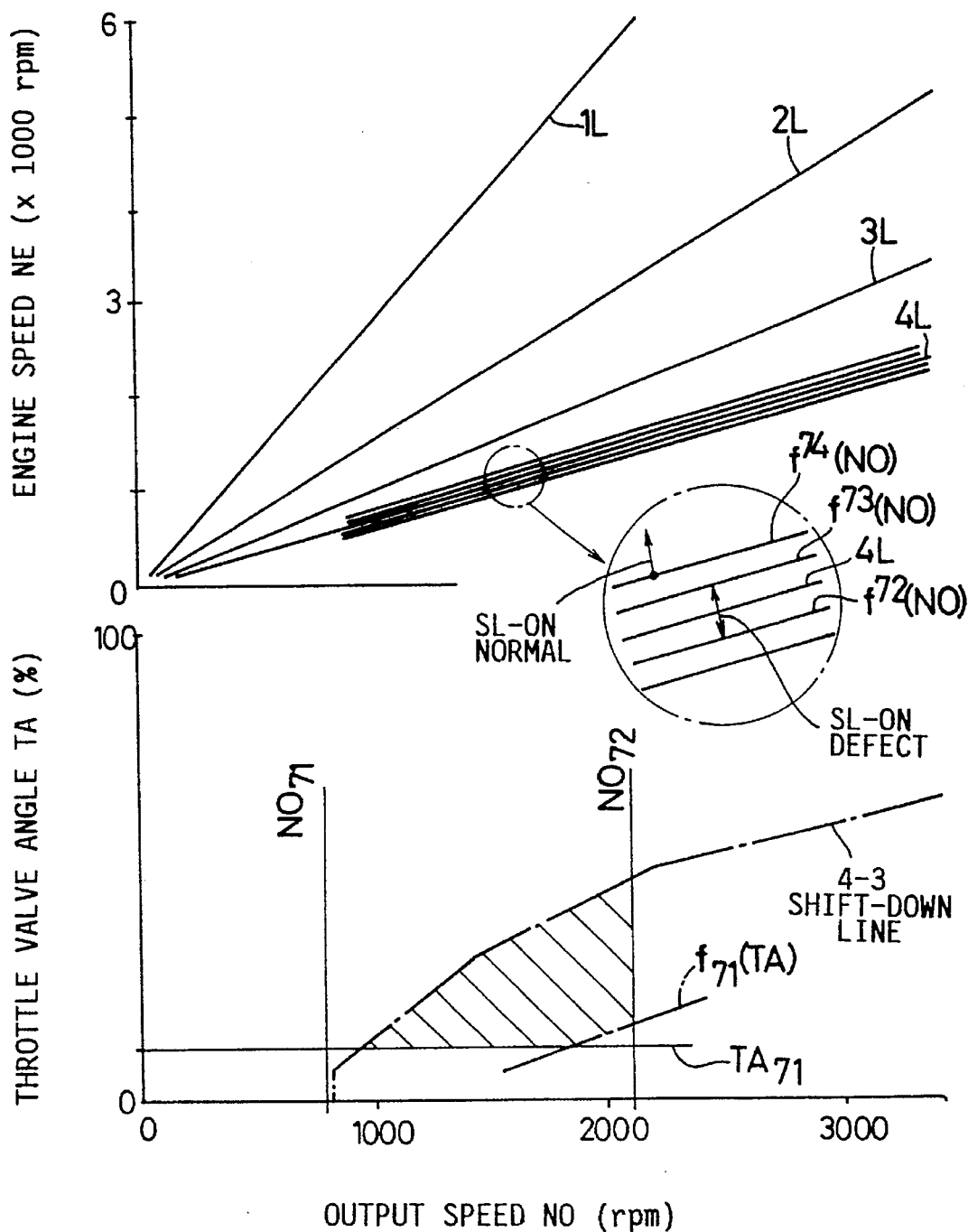
FIG. 18, comprising of FIGS. 18A and 18B, is a graph for explaining a detection area in the sub-routine of FIG. 17.

The above requirement (a) is formulated to assure a sufficient amount of difference between the speeds of the torque converter 12when the lock-up clutch 32 is placed in the encaged and released positions with the transmission 14 shifted to the fourth-speed position (4L, 4T), while the vehicle is running with under a relatively high load with the engine 10 placed in a power drive mode. The above threshold values $NO_{71}$ and $NO_{62}$ are selected to be about 800 r.p.m. and 2100 r.p.m., respectively, while the $f_{71}(TA)$ is selected to be about $(54 \times TA+1200)$. On the other hand, the threshold values $TA_{71}$ is selected to be about 12%. The requirement (a) defines a TA-NO relationship area indicated by hatching in the lower graph of FIG. 18. The above requirement (b) is provided to avoid the present diagnosis of FIG. 17 while the vehicle is running at a relatively high altitude, namely, to permit the diagnosis only when the intake air quantity GN is sufficient in relation to the output torque of the engine 10. For instance, the threshold $GN_1$ is selected at about 0.7 g/rev. when an air conditioner of the vehicle is in operation, and about 0.5 g/rev. when the air conditioner is not in operation. The requirement (e) is provided to effect the diagnosis while the transmission 14 is in a steady state. For example, the threshold value $CMES_7$ is selected to be about three seconds.

Then, the control flow goes to step S9-2 to determine whether all of the five requirements (a) through (e) are satisfied. If a negative decision (NO) is obtained in step S9-2, one cycle of execution of the sub-routine of FIG. 17 is terminated. If an affirmative decision (YES) is obtained in step S9-2, the control flow goes to step S9-3 to determine, on the basis of the detected speed NO, threshold levels $f^{72}(NO)$ and $f^{73}(NO)$ of the engine speed NE. These threshold levels $f^{72}(NO)$ and $f^{73}(NO)$, which are determined on the basis of the detected output shaft speed NO, are indicated in the upper graph of FIG. 18. The threshold level $f^{72}(NO)$ is lower by a suitable amount (e.g., 50 r.p.m.) than the level represented by the line for the fourth-speed position 4L, while the threshold level $f^{74}(NO)$ is higher by a suitable amount (e.g., 50 r.p.m.) than the level represented by the line for the fourth-speed position 4L. The amounts indicated above can be determined by experiment. If the engine speed NE is outside a range between the threshold levels $f^{72}(NO)$ and $f^{73}(NO)$, the lock-up clutch is considered to be placed in the released position with the transmission 14 placed in the fourth-speed position. The determined threshold levels $f^{72}(NO)$ and $f^{73}(NO)$ are stored in the RAM.

Step S9-3 is followed by step S9-4 to determine whether an abnormal-ON condition of the valve SL is satisfied, that is, whether the engine speed NE detected by the engine speed sensor 64 is higher than the threshold level $f^{72}(NO)$ and lower than the threshold level $f^{73}(NO)$. If the engine speed NE is held within the range between these threshold levels, this means that the lock-up clutch 32 is placed in the engaged position although it is commanded to be placed in the released position with the transmission 14 placed in the fourth-speed position, that is, the plunger of the valve SL is abnormally kept in its ON position, which indicates that there exists the SL-ON defect.

If a negative decision (NO) is obtained in step S9-4, the control flow goes to step S9-9 and the following steps to effect a diagnosis to determine whether the plunger of the valve SL can be moved from the ON position to the OFF position, that is, whether the SL-ON defect has been removed. If an affirmative decision (YES) is obtained in step S9-4, the control goes to step S9-5 to determine whether the abnormal-ON condition of the valve SL has been satisfied consecutive N times, that is, whether the affirmative decision (YES) has been obtained in step S9-4 a predetermined number (N) of times consecutively, for instance five times. If a negative decision (NO) is obtained in step S9-5, the control goes to step S9-9. If an affirmative decision (YES) is obtained in step S9-5, the control flow goes to step S9-6 to effect a processing that permits the following steps to be implemented only once for each shift command to shift the transmission 14 to the fourth-speed position 4T with the lock-up clutch 32 placed in the released position. Step S9-6 is followed by step S9-7 to determine whether a PRELIMINARY SL-ON DEFECT flag XDSLONJ is set at "1". Since this flag XDSLONJ is initially set at "0", a negative decision (NO) is obtained in step S9-7, and the control flow goes to step S9-8 to set the flag XDSLONJ to "1".

Upon generation of the second shift command to shift the transmission 14 to the fourth-speed position 4T with the lock-up clutch 32 placed in the released position, an affirmative decision (YES) is obtained in step S9-7, and the control flow goes to step S9-9 to set an SL-ON DEFECT flag XDSLON to "1".

Step S9-9 is followed by step S9-10 to determine, on the basis of the detected output shaft speed No, a lower limit $f^{74}(NO)$ of a reference range of the engine speed NE within which the engine speed NE is expected to fall if the transmission 14 is actually placed in the commanded fourth-speed position 4T with the lock-up clutch 32 placed in the released position. As indicated in the upper graph of FIG. 18, the lower limit $f^{74}(NO)$ is determined to be higher by a suitable amount (e.g., 100 r.p.m.) than the level represented by the line for the position 4L. The lower limit $f^{74}(NO)$ defining the reference range is stored in the RAM.

Step S9-10 is followed by step S9-11 to determine whether a normal-ON condition of the valve SL is satisfied, that is, whether the detected engine speed NE is higher than the lower limit $f^{74}(NO)$, that is, held within the reference range. If an affirmative decision (YES) is obtained in step S9-11, this means that the plunger of the third solenoid-operated valve SL can be moved from the ON position to the OFF position, that is, the SL-ON defect has been removed. In this case, the control flow goes to step S9-12 to determine that the normal-ON condition has been satisfied a predetermined number of times consecutively, for example, five consecutive times. If a negative decision (NO) is obtained in step S9-12, one cycle of execution of the sub-routine of FIG. 17 is terminated. If an affirmative decision (YES) is obtained in step S9-12, the control flow goes to step S9-13 to set an SL-ON NORMAL flag XPSLON to "1", and step S9-14 to reset the PRELIMINARY SL-ON DEFECT flag XDSLONJ to "0".

In the present embodiment, steps S9-4 and S9-9 correspond to means for determining whether the plunger of the valve SL is abnormally kept in the ON position, while steps S9-11 and S9-13 correspond means for determining that the plunger of the valve SL can be normally moved from the ON position to the OF position.

Step S9 of the main routine of FIG. 5 is followed by step S10 to determine whether any defect has been detected, that is, whether any one of the flags XDS1OF, XDS1ON, XDS2OF, XDS2ON, XDSLOF and XDSLON is set at "1". If a negative decision (NO) is obtained in step S10, the control flow goes to step S12, skipping the following step S11. If an affirmative decision (YES) is obtained in step S10, the control flow goes to step S11 to effect a diagnostic processing in which a defect is determined on the basis of a signal from the detector unit 76 and the contents of the above-identified flags, and data indicative of the determined defect are stored in the RAM of the electronic control unit 52. Further, an appropriate code signal indicative of the detected defect is generated to activate a suitable alarm indicator or display, for example, so that the operator of the vehicle is informed of the detected defect associated with the automatic transmission system. For example, the control unit 52 generates a signal indicating that the plunger of the first solenoid-operated valve S1 is stuck in its OFF position, if the S1-OFF DEFECT flag XDS1OF is set at "1" and if the output signals of the detector unit 76 do not indicate electrical disconnection or short circuiting of the solenoid coils of the valve S1.

Step S12 is provided to determine whether any one of the flags XPS1OF, XPS1ON, XPS2OF, XPS2ON, XPSLOF and XPSLON is set at "1". If a negative decision (NO) Is obtained in step S12, one cycle of execution of the main routine of FIG. 5 is terminated. If an affirmative decision (YES) is obtained in step S12, the control flow goes to step S13 to effect a processing which includes de-activation of the appropriate alarm indicator or display, and erasing the corresponding data stored in the RAM.

It will be understood from the foregoing description of the present embodiment of the invention that the steps S4-3, S5-3, S5-8, S6-3, S6-10, S7-3 and S7-9 correspond to means for determining reference ranges of the engine speed NE used to determine whether there exist defects of the first and second solenoid-operated valves S1 and S2, while the steps S4-1, S5-1, S6-1 and S7-1 corresponds to means for determining whether the vehicle is placed in predetermined running conditions that permit accurate determination on the basis of the engine speed NE as to whether there exist the defects. It will also be understood that the steps S4-4, S4-9, S5-4, S5-7, S5-9, S5-11, S6-4, S6-9, S6-11, S6-13, S7-4, S7-7, S7-10 and S7-12 correspond to means for determining the presence and absence of the defects depending upon whether the engine speed after a shifting action of the transmission 14 in response to a shift command is held within or outside the predetermined ranges, while the vehicle is placed in the predetermined running conditions.

The present diagnosing apparatus using the reference ranges of the engine speed NE and the vehicle running conditions assures accurate determination of the presence of the defects of the solenoid-operated valves S1 and S2, even if there exists a deviation of the engine speed NE from the speed of the input shaft 20 of the transmission 14 in the presence of the torque converter 12 interposed therebetween. This diagnosing apparatus which does not require a speed sensor for detecting the input shaft speed of the transmission 14 does not increase the size, weight and cost of the transmission, and is capable of diagnosing the solenoid-operated valves S1, S2 with high accuracy and reliability.

It is also noted that the step S4-12 corresponds to speed change detecting means for detecting a decrease in the engine speed NE in response to a shift command generated by the electronic control unit 52 to shift the transmission 14 from the first-speed position to the second-speed position, and that the steps S4-14, S4-15 and S4-16 correspond to non-defect determining means for determining that the plunger of the first solenoid-operated valve S1 can be normally moved from the OFF position to the ON position, if the amount of decrease ΔNE of the engine speed NE is larger than a predetermined threshold. This arrangement also assures accurate determination as to the removal of the OFF-sticking defect of the valve S1, without using a speed sensor for detecting the input shaft speed of the transmission 14.

It will also be understood that the steps S8-3, S8-7, S9-3 and S9-10 correspond to means for determining reference ranges of the engine speed NE used to determine whether there exist defects of the third solenoid-operated valve SL, while the steps S8-4, S8-7, S8-10, S8-12, S9-4, S9-9, S9-11 and S9-13 correspond to means for determining the presence and absence of the defects depending upon whether the engine speed after generation of a lock-up command to bring the lock-up clutch 32 to its engaged position is held within or outside the predetermined ranges, while the vehicle is placed in the predetermined running conditions. This arrangement utilizes a speed difference of the engine 10 and the input shaft 20 of the transmission 14 due to the action of the torque converter 12, to determine the presence of the defects of the valve SL assigned to control the lock-up clutch 32.

While one presently preferred embodiment of the present invention has been described in detail, there will be described other embodiments of the invention. In the interest of brevity and simplification, the same reference numerals and signs as used in the first embodiment of FIGS. 1–18 will be used to identify the corresponding components or elements.

Figure 19:
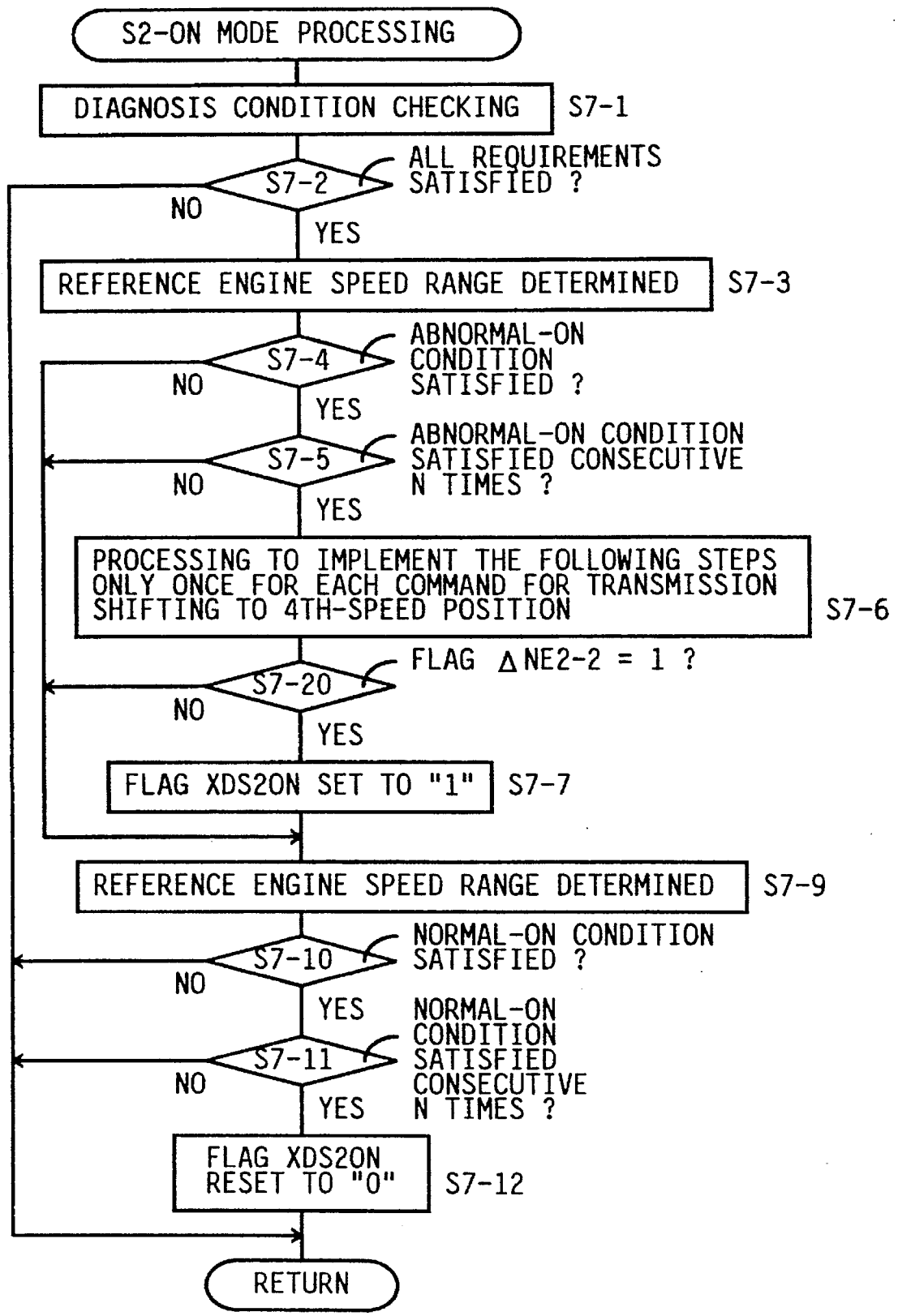
FIG. 19 is a flow chart illustrating a sub-routine corresponding to that of FIG. 13, which is used in another embodiment of the present invention.

Referring to the flow chart of FIG. 16, there is illustrated a modification of the S2-ON mode processing sub-routine which may be used in place of the sub-routine of FIG. 13. The present S2-ON mode processing sub-routine of FIG. 19 is different from that of FIG. 13, in that step S7-20 is provided between steps S7-6 and S7-7 in the present sub-routine, to determine whether a flag ΔNE2-2 is set at "1" or not. If a negative decision (NO) is obtained in step S7-20, the control flow goes to step S7-9 and the following steps to determine whether the plunger of the valve S2 can be moved from the ON position to the OFF position. If an affirmative decision (YES) is obtained in step S7-9, the control flow goes to step S7-7 to set the flag XDS2ON to "1". The flag ΔNE2-2 is set to "1" when the amount of decrease ΔNE of the engine speed NE is smaller than the threshold value ΔNE$_2$. Namely, this flag is set to "1" when the negative decision (NO) is obtained in step S4-12 of the S1-OFF mode processing sub-routine of FIG. 7.

If the affirmative decision (YES) is obtained in step S7-20, this means that the detected engine speed NE indicates that the transmission 14 is placed in the third-speed position even when the shift command generated by the control unit 52 commands the transmission 14 to be shifted to the fourth-speed position, and that the amount of engine speed decrease ΔNE upon generation of the shift command to shift the transmission 14 from the first-speed position to the second-speed position does not exceed the threshold ΔNE$_2$. In this case, therefore, step S7-7 is implemented to set the S2-ON DEFECT flag XDS2ON to "1". If the negative decision (NO) is obtained in step S7-20, this means that while the transmission 14 is placed in the third-speed position even when it has been commanded to be shifted to the fourth-speed position, the amount of decrease of the engine speed NE exceeds the threshold upon generation of the shift command to shift the transmission from the first-speed position to the second-speed position. In this case, it is considered that the spool of the 3–4 shift valve (3–4 SV) is stuck in the position for establishing the third-speed position, and therefore the control flow goes to step S7-9 without implementing step S7-7, since the plunger of the second solenoid-operated valve S2 is not abnormally kept in its ON position, but the 3–4 shift valve is abnormally stuck.

Figure 20:
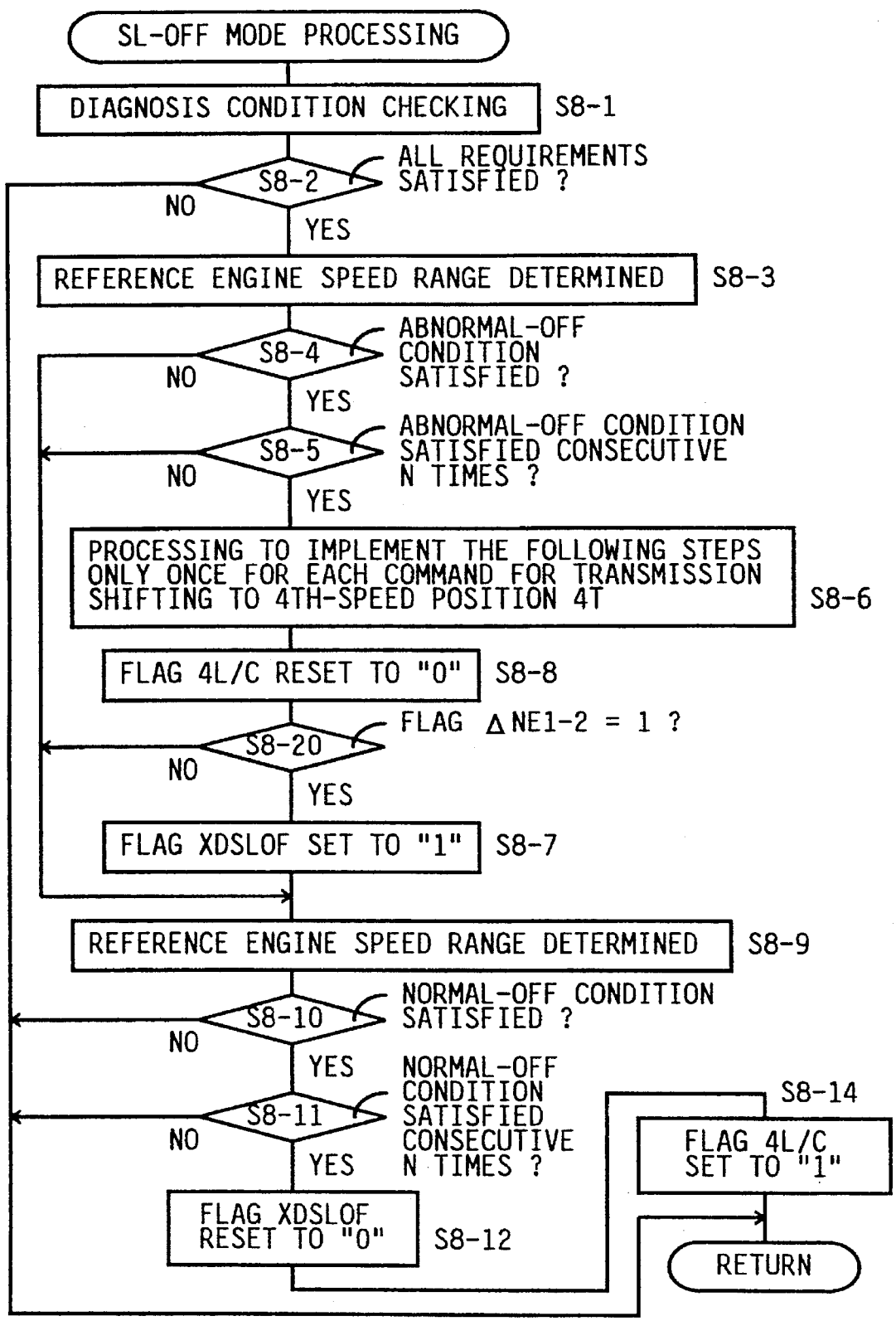
FIG. 20 is a flow chart illustrating a sub-routine corresponding to that of FIG. 16, which is used in a further embodiment of the invention.

Referring next to the flow chart of FIG. 20, there is illustrated a modification of the SL-OFF mode processing sub-routine of FIG. 16. The sub-routine of FIG. 20 is different from that of FIG. 16, in that step S8-20 is provided between steps S8-8 and S8-7 in the embodiment of FIG. 20, to determine whether a flag ΔNE1-2 is set at "1". If a negative decision (NO) is obtained in step S8-10, the control flow goes to step S8-9 and the following steps to determine whether the plunger of the third solenoid-operated valve SL can be moved from the OFF position to the ON position. If an affirmative decision (YES) is obtained in step S8-20, the control flow goes to step S807 to set the SL-OFF DEFECT flag XDSLOF to "1". The flag ΔNE1-2 is set to "1" when the amount of engine speed decrease ΔNE exceeds the threshold ΔNE$_2$, that is, when the affirmative decision (YES) is obtained in step S4-12 of FIG. 7.

If the affirmative decision (YES) is obtained in step S8-20, this means that the detected engine speed NE indicates that the transmission 14 is placed in the fourth-speed position 4T with the lock-up clutch 32 placed in the released position even when the lock-up clutch 32 has been commanded by the control unit 52 to be placed in the engaged position, and that the amount of engine speed decrease ΔNE upon generation of the shift command to shift the transmission 14 from the first-speed position to the second-speed position exceeds the threshold ΔNE$_2$. In this case, therefore, step S8-7 is implemented to set the SL-OFF DEFECT flag XDSLOF to "1". If the negative decision (NO) is obtained in step S8-20, this means that while the transmission 14 is placed in the fourth-speed position with the lock-up clutch 32 placed in the released position even when the lock-up clutch 32 has been commanded to be placed in the engaged position, the amount of decrease of the engine speed NE does not exceed the threshold upon generation of the shift command to shift the transmission from the first-speed position to the second-speed position, that is, the transmission 14 cannot be shifted from the first-speed position to the second-speed position. In this case, it is considered that the spool of the 1–2 shift valve (1–2 SV) is stuck in the position for establishing the first-speed position, and therefore the control flow goes to step S8-9 without implementing step S8-9, since the plunger of the third solenoid-operated valve SL is not abnormally kept in its OFF position, but the 1–2 shift valve is abnormally stuck.

Figure 21:
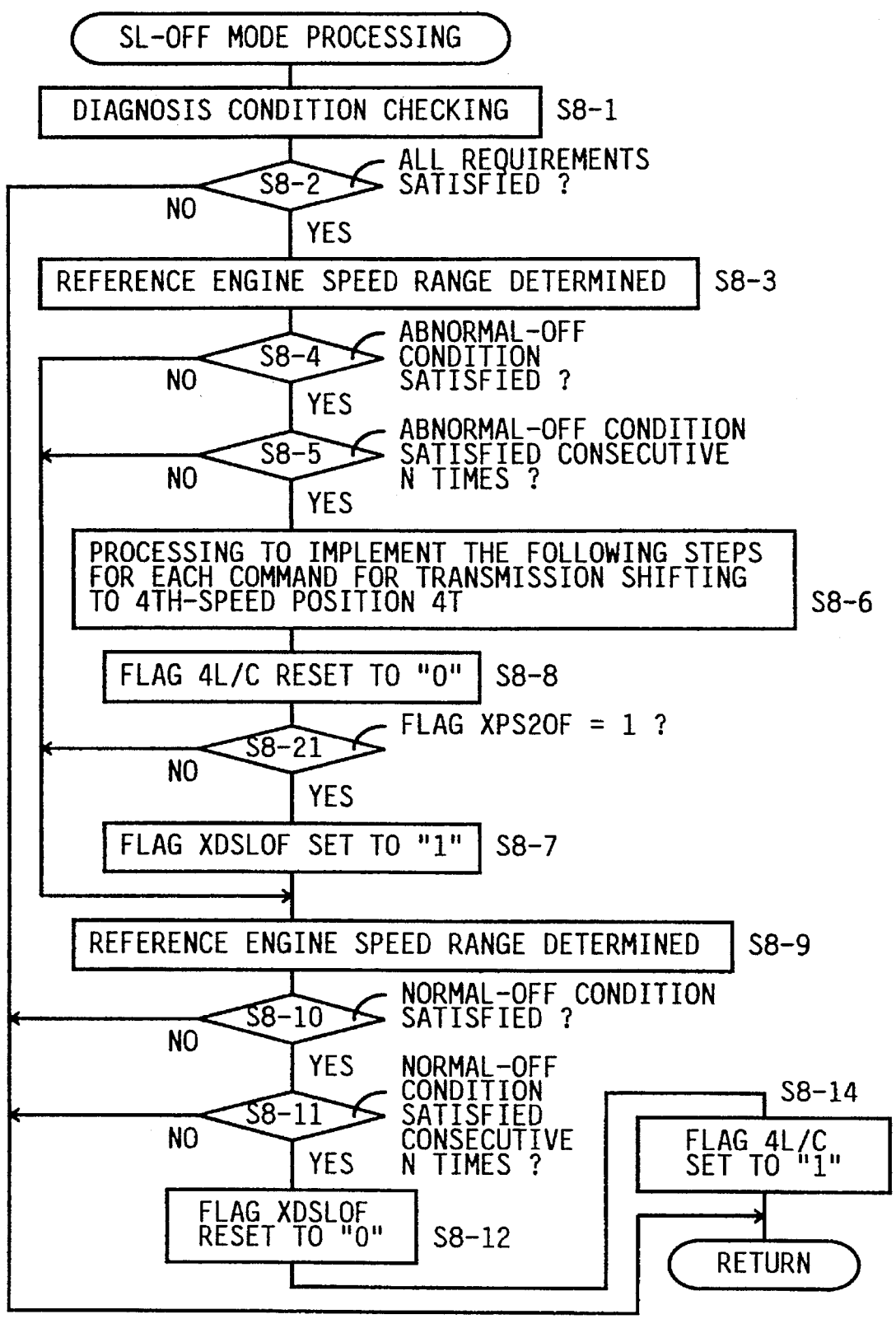
FIG. 21 is a flow chart illustrating a sub-routine corresponding to that of FIG. 16, which is used in a still further embodiment of the invention.

Another modification of the SL-OFF mode processing sub-routine of FIG. 16 is illustrated in the flow chart of FIG. 21. The sub-routine of FIG. 21 is different from that of FIG. 20, in that step S8-20 of FIG. 20 is replaced by step S8-21 in the sub-routine of FIG. 21. Step S8-21 is formulated to determine whether the S2-OFF NORMAL flag XPS2OF which is set to "1" in step S6-13 of the S2-OFF mode processing sub-routine of FIG. 11 is set at "1". This step S8-21 has substantially the same function as step S8-20 of FIG. 20.

While the present invention has been described in its presently preferred embodiments, it is to be understood that the present invention is not limited to the details of the illustrated embodiments, but may be otherwise embodied.

The hydraulic control device 50 is arranged such that different defects cause different combinations of shifting errors when the transmission 14 is commanded to be shifted to the different positions, as indicated in FIGS. 22, 23 and 24. The relationships between the particular defects and the shifting errors make it possible to determine whether the solenoid-operated valve S2 or SL or the 1–2 shift valve or 3–4 shift valve has the defect which causes the specific shifting error or errors. If the relationship of FIG. 22 is utilized, the S2-OFF mode processing sub-routine of FIG. 11 may be modified so as to eliminate the requirement (c) used in step S6-1, and insert before step S6-6 an additional step of determining on the basis of the engine speed NE whether the lock-up clutch 32 has been held in the engaged position or in the released position with the transmission 14 placed in the fourth-speed position until it is commanded to be engaged. If the lock-up clutch 32 has been held in the engaged position, the control flow goes to step S6-6. If the lock-up clutch 32 has been held in the engaged position, the control goes to step S6-10, skipping steps S6-6 through S6-9. Further, step S6-4 may be modified to include: a first step of determining on the basis of the engine speed NE whether the lock-up clutch 32 is brought to the engaged position with the transmission 14 placed in the fourth-speed position 4L when the lock-up clutch 32 is commanded to be engaged; a second step which is implemented if an affirmative decision is obtained in the first step, to determine on the basis of the engine speed NE whether the transmission 14 is placed in the first-speed position 1T after it has been commanded to be shifted to the second-speed position 2T; and a third step which is implemented if an affirmative decision is obtained in the second step, to determine that the 1–2 shift valve is abnormally stuck in the position for establishing the first-speed position.

If the relationship of FIG. 23 is utilized, step S7-4 of the S2-ON mode processing sub-routine of FIG..13 may be modified to include: a first step of determining on the basis of the engine speed NE whether the transmission 14 is placed in the third-speed position 3L after it has been commanded to be shifted to the fourth-speed position 4L; a second step which is implemented if an affirmative decision is obtained in the first step, to determine whether the valve S2 is abnormally kept in its ON position, by comparing the engine speed decrease amount ΔNE with the threshold when the transmission 14 is commanded to be shifted from the first-speed position to the second-speed position; and a third step which is implemented if an affirmative decision is obtained in the second step, to determine that the 3–4 shift valve is abnormally stuck in the position for establishing the third-speed position.

If the relationship of FIG. 24 is utilized, step S8-4 of the SL-OFF mode processing sub-routine of FIG. 16 may be modified so as to include: a first step of determining on the basis of the engine speed NE whether the lock-up clutch 32 is placed in the released position with the transmission 14 placed in the fourth-speed position 4T when the lock-up clutch 32 has been commanded to be engaged; a second step which is implemented if an affirmative decision is obtained in the first step, to determine whether the valve SL is abnormally kept in the OFF position, by comparing the engine speed decreased amount ΔNE with the threshold when the transmission 14 is commanded to be shifted from the first-speed position to the second-speed position; and a third step which is implemented if an affirmative decision is obtained in the second step, to determine that the 1–2 shift valve is abnormally stuck in the position for establishing the first-speed position.

The relationship of FIG. 24 may also be utilized to modify step S8-4 of the SL-OFF mode processing sub-routine of FIG. 16, so as to include: a first step of determining on the basis of the engine speed NE whether the lock-up clutch 32 is placed in the released position with the transmission 14 placed in the fourth-speed position 4T when the lock-up clutch 32 has been commanded to be engaged; a second step which is implemented if an affirmative decision is obtained in the first step, to determine whether the transmission 14 is placed in the second-speed position 2T or in the first-speed position 1T when the transmission 14 si commanded to be shifted to the second-speed position 2T; and a third step of determining that the valve SL is abnormally stuck in the OFF position if the second step indicates that the transmission is placed in the second-speed position 2T, and determining that the 1–2 shift valve is abnormally stuck in the position for establishing the first-speed position, if the second step indicates that the transmission is placed in the first-speed position 1T.

The S1-ON mode processing sub-routine of FIG. 9 may be modified such that steps S5-9 through S5-11 are replaced by steps similar to steps S4-14 through S4-18 of FIG. 7.

Although the output shaft speed NO of the transmission 14 is used to determine the reference ranges used for the various diagnostic sub-routines, the output shaft speed NO may be replaced by the vehicle speed V. Further, the throttle opening angle TA may be replaced by equivalent parameters such as an amount of operation of an accelerator pedal provided on the vehicle.

While the transmission 14 in the illustrated embodiments has four forward drive positions, by way of example, the principle of the present invention is equally applicable to an automatic transmission having three, or five or more forward drive positions.

In the illustrated embodiments, the torque converter 12 is used as a fluid-actuated power transmitting device between the engine 10 and the transmission 14. However, other fluid-actuated power transmitting devices such as a fluid coupling may be used.

It is to be understood that the present invention may be embodied with various other changes, modifications and improvements, which may occur to those skilled in the art, without departing from the spirit and scope of the invention defined in the following claims.

What is claimed is:

1. A diagnosing apparatus for detecting a defect associated with an automatic transmission system of a motor vehicle, said automatic transmission system including (a) an automatic transmission having a plurality of operating positions, operatively connected to an engine of the vehicle through a fluid-actuated power transmitting device, and incorporating a plurality of frictional coupling devices for establishing said operating positions, (b) a plurality of solenoid-operated valves for controlling operating states of said frictional coupling devices according to shift commands, and (c) an electronic control device which generates the shift commands to place said automatic transmission in a selected one of said plurality of operating positions, depending upon a running condition of the vehicle, said diagnosing apparatus comprising:

engine speed detecting means for detecting a speed of said engine;

range determining means for determining a reference range of the speed of the engine within which the speed of the engine is expected to fall when said automatic transmission is placed in one of said operating positions which is selected by a shift command generated by said electronic control device;

condition determining means for determining whether said vehicle is placed in a predetermined running condition; and defect detecting means for determining whether there exists a defect associated with said automatic transmission system, depending upon whether the speed of the engine detected by said engine speed detecting means is held within or outside said reference range when said condition determining means determines that said vehicle is placed in said predetermined running condition.

2. A diagnosing apparatus as set forth in claim 1, wherein said condition determining means uses at least one parameter each relating to one of (a) a running speed of the vehicle, (b) the operating position of said automatic transmission which is selected by said shift command, and (c) an opening angle of a throttle valve of said engine, to determine whether the vehicle is placed in said predetermined running condition, said condition determining means requiring each of said at least one parameter to be held within a predetermined range, to determine that said predetermined running condition of the vehicle is satisfied.

3. A diagnosing apparatus as set forth in claim 1, wherein said defect detecting means operates after the speed of the engine is stabilized.

4. A diagnosing apparatus as set forth in claim 1, further comprising:

speed change detecting means for detecting a change in the speed of the engine in response to said shift command generated by said electronic control device;

non-defect determining means for making a determination that one of said solenoid-operated valves whose operating state should be changed to effect a shifting action of said automatic transmission according to said shift command is normally functioning, if said speed change detecting means has detected said change in the speed of the engine in response to said shift command; and said defect detecting means localizing said defect on the basis of said determination made by said non-defect detecting means.

5. A diagnosing apparatus as set forth in claim 1, wherein said automatic transmission system further includes a lock-up clutch which is disposed between said engine and said automatic transmission, said lock-up clutch having an engaged position for direct connection of said engine to said automatic transmission, and a released position in which an output of the engine is transmitted to said automatic transmission through said fluid-actuated power transmitting device, said automatic transmission system further including another solenoid-operated valve for placing said lock-up clutch in one of said engaged and released positions, said diagnosing apparatus further comprising:

another range determining means for determining a another reference range of the speed of the engine within which the speed of the engine is expected to fall when said lock-up clutch is placed in said engaged position according to a lock-up command generated by said electronic control device; and another defect detecting means for making a determination as to whether said automatic transmission system is defective, depending upon whether the speed of the engine detected by said engine speed detecting means after generation of said lock-up command is held within or outside said another reference range determined by said another range determining means, and wherein said defect detecting means localizes said defect on the basis of said determination made by said another defect detecting means.

6. The diagnosing apparatus of claim 1, wherein said defect detecting means determines whether there is a defect associated with any one of the fluid actuated power transmitting device, the plurality of frictional coupling devices and plungers of the solenoid operated valves.

7. A diagnosing apparatus for detecting a defect associated with an automatic transmission system of a motor vehicle, said automatic transmission system including (a) an automatic transmission having a plurality of operating positions and incorporating a plurality of frictional coupling devices for establishing said operating positions, (b) a plurality of solenoid-operated valves for controlling operating states of said frictional coupling devices according to shift commands, and (c) an electronic control device which generates the shift commands to place said automatic transmission in a selected one of said plurality of operating positions, said diagnosing apparatus comprising:

engine speed detecting means for detecting a speed of said engine;

speed change detecting means for detecting a change in the speed of the engine in response to said shift command generated by said electronic control device; and non-defect determining means for determining that one of said solenoid-operated valves whose operating state should be changed to effect a shifting action of said automatic transmission according to said shift command is normally functioning, if said speed change detecting means has detected said change in the speed of the engine in response to said shift command.

8. A diagnosing apparatus as set forth in claim 7, further comprising condition determining means for determining whether said vehicle is placed in a predetermined running condition, and wherein said non-defect determining means operates only when said condition determining means determines that said vehicle is placed in said predetermined running condition.

9. A diagnosing apparatus as set forth in claim 8, wherein said condition determining means uses at least one parameter each relating to one of (a) a running speed of the vehicle, (b) the operating position of said automatic transmission which is selected by said shift command, and (c) an opening angle of a throttle valve of said engine, to determine whether the vehicle is placed in said predetermined running condition, said condition determining means requiring each of said at least one parameter to be held within a predetermined range, to determine that said predetermined running condition of the vehicle is satisfied.

10. A diagnosing apparatus as set forth in claim 7, wherein said non-defect determining means operates after the speed of the engine is stabilized.

11. A diagnosing apparatus as set forth in claim 7, wherein said automatic transmission system further includes a lock-up clutch which is disposed between said engine and said automatic transmission, said lock-up clutch having an engaged position for direct connection of said engine to said automatic transmission, and a released position in which an output of the engine is transmitted to said automatic transmission through a fluid-actuated power transmitting device, said automatic transmission system further including another solenoid-operated valve for placing said lock-up clutch in one of said engaged and released positions, said diagnosing apparatus further comprising:

range determining means for determining a reference range of the speed of the engine within which the speed of the engine is expected to fall when said lock-up clutch is placed in said engaged position according to said lock-up command generated by said electronic control device; and defect detecting means for making a determination as to whether said automatic transmission system has a defect, depending upon whether the speed of the engine detected by said speed detecting means is held within or outside said reference range determined by said range determining means, and wherein said non-defect determining means and said defect detecting means cooperate to localize said defect.

12. The diagnosing apparatus of claim 7, wherein said defect detecting means determines whether there is a defect associated with any one of the plurality of frictional coupling devices and plungers of said solenoid operated valves.

13. A diagnosing apparatus for detecting a defect associated with an automatic transmission system of a motor vehicle, said automatic transmission system including (a) an automatic transmission having a plurality of operating positions and incorporating a plurality of frictional coupling devices for establishing said operating positions, (b) a plurality of first solenoid-operated valves for controlling operating states of said frictional coupling devices according to shift commands, (c) a lock-up clutch disposed between said engine and said automatic transmission and having an engaged position for direct connection of said engine to said automatic transmission and a released position in which an output of the engine is transmitted to said automatic transmission through a fluid-actuated power transmitting device, (d) a second solenoid-operated valve for placing said lock-up clutch in a selected one of said engaged and released positions according to a lock-up command, and (e) an electronic control device which generates said lock-up command, and said shift commands to place said automatic transmission in a selected one of said plurality of operating positions, said diagnosing apparatus comprising:

engine speed detecting means for detecting a speed of said engine;

range determining means for determining a reference range of the speed of the engine within which the speed of the engine is expected to fall when said said lock-up clutch is placed in said engaged position according to a lock-up command generated by said electronic control device; and defect detecting means for determining whether said automatic transmission system is defective, depending upon whether the speed of the engine detected by said engine speed detecting means is held within or outside said reference range.

14. A diagnosing apparatus as set forth in claim 13, further comprising condition determining means for determining whether said vehicle is placed in a predetermined running condition, and wherein said defect detecting means operates when said condition determining means determines that said vehicle is placed in said predetermined running condition.

15. A diagnosing apparatus as set forth in claim 13, wherein said condition determining means uses at least one parameter each relating to one of (a) a running speed of the vehicle, (b) the operating position of said automatic transmission which is selected by said shift command, and (c) an opening angle of a throttle valve of said engine, to determine whether the vehicle is placed in said predetermined running condition, said condition determining means requiring each of said at least one parameter to be held within a predetermined range, to determine that said predetermined running condition of the vehicle is satisfied.

16. A diagnosing apparatus as set forth in claim 13, wherein said defect detecting means operates after the speed of the engine is stabilized.

17. The diagnosing apparatus of claim 13, wherein said defect detecting means determines whether there is a defect associated with any one of the plurality of frictional coupling devices, the lock up clutch and plungers of said solenoid operated valves.

* * * * *